(12) United States Patent
Chi et al.

(10) Patent No.: US 11,243,633 B2
(45) Date of Patent: Feb. 8, 2022

(54) PRESSURE SENSING MODULE, TOUCH PANEL AND METHOD OF DETECTING TWO-POINT TOUCH PRESSURE OF TOUCH PANEL

(71) Applicant: TPK ADVANCED SOLUTIONS INC., Xiamen (CN)

(72) Inventors: Ho-Hsun Chi, Hsinchu County (TW); Tsai-Kuei Wei, Hsinchu County (TW); Cai-Jin Ye, Fujian (CN); Feng Chen, Fujian (CN); Wei Wei, Fujian (CN)

(73) Assignee: TPK ADVANCED SOLUTIONS INC., Xiamen (CN)

( * ) Notice: Subject to any disclaimer, the term of this patent is extended or adjusted under 35 U.S.C. 154(b) by 0 days.

(21) Appl. No.: 16/553,198

(22) Filed: Aug. 28, 2019

(65) Prior Publication Data
US 2020/0167029 A1 May 28, 2020

(30) Foreign Application Priority Data
Aug. 24, 2018 (CN) .......................... 201810973194.1

(51) Int. Cl.
*G06F 3/041* (2006.01)
(52) U.S. Cl.
CPC .......... *G06F 3/0414* (2013.01); *G06F 3/0412* (2013.01); *G06F 2203/04105* (2013.01)
(58) Field of Classification Search
CPC ................. G06F 3/0414; G06F 3/0412; G06F 2203/04105

(Continued)

(56) References Cited

U.S. PATENT DOCUMENTS

| 2010/0045624 A1* | 2/2010 | Hisatsugu | ............. G06F 3/0338 |
| | | | 345/173 |
| 2012/0126940 A1* | 5/2012 | Coggill | ................... G06F 21/36 |
| | | | 340/5.54 |

(Continued)

FOREIGN PATENT DOCUMENTS

| TW | 201709038 A | 3/2017 |
| TW | 201812265 A | 4/2018 |

OTHER PUBLICATIONS

Office Action of corresponding Japanese patent application No. 2019-153160 dated Jun. 22, 2021.

*Primary Examiner* — Jonathan M Blancha
(74) *Attorney, Agent, or Firm* — Idea Intellectual Limited; Margaret A. Burke; Sam T. Yip

(57) ABSTRACT

The present disclosure relates to a pressure sensing module, a touch panel and a method of detecting a two-point touch pressure of a touch panel. The pressure sensing module includes a substrate and a sensing layer formed over the substrate. The sensing layer includes a plurality of pressure sensing units. The pressure sensing units are axially symmetrically disposed along a symmetry axis of the substrate to form a first pressure sensing region and a second pressure sensing region. The pressure sensing unit includes four resistors having a same resistance. The four resistors are configured as a Wheatstone bridge, in which pattern shapes of two of the resistors have a same extending direction and are not adjacent. The touch panel includes the pressure sensing module described above. The method of detecting the two-point touch pressure of the touch panel is used to detect the two-point touch pressure on the touch panel.

14 Claims, 17 Drawing Sheets

(58) Field of Classification Search
USPC .......................................................... 345/173
See application file for complete search history.

(56) References Cited

U.S. PATENT DOCUMENTS

| | | |
|---|---|---|
| 2017/0329448 A1 | 11/2017 | Li et al. |
| 2018/0046286 A1* | 2/2018 | Zhou ........................ G06F 3/041 |
| 2018/0074638 A1 | 3/2018 | Chiang et al. |
| 2018/0173347 A1* | 6/2018 | Liu .................... G02F 1/133514 |
| 2018/0181249 A1* | 6/2018 | Li ........................ G06F 3/04142 |

* cited by examiner

| KA | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0.42 | 0.42 | 0.44 | 0.48 | 0.42 | 0.43 | 0.37 | 0.32 | 0.25 | 0.22 | 0.16 | 0.13 | 0.12 | 0.08 | 0.05 |
| B | 0.63 | 0.63 | 0.70 | 0.78 | 0.71 | 0.71 | 0.63 | 0.64 | 0.45 | 0.39 | 0.30 | 0.26 | 0.21 | 0.11 | 0.10 |
| C | 0.68 | 0.73 | 0.82 | 0.90 | 0.90 | 0.87 | 0.81 | 0.69 | 0.59 | 0.80 | 0.40 | 0.29 | 0.27 | 0.16 | 0.12 |
| D | 0.72 | 0.76 | 0.88 | 0.93 | 0.96 | 0.94 | 0.86 | 0.70 | 0.64 | 0.55 | 0.43 | 0.33 | 0.29 | 0.17 | 0.14 |
| E | 0.62 | 0.68 | 0.81 | 0.92 | 0.92 | 0.88 | 0.81 | 0.66 | 0.58 | 0.49 | 0.40 | 0.29 | 0.27 | 0.16 | 0.13 |
| F | 0.59 | 0.62 | 0.69 | 0.77 | 0.74 | 0.71 | 0.64 | 0.59 | 0.49 | 0.35 | 0.30 | 0.26 | 0.21 | 0.11 | 0.10 |
| G | 0.36 | 0.37 | 0.38 | 0.47 | 0.44 | 0.47 | 0.38 | 0.28 | 0.26 | 0.19 | 0.16 | 0.13 | 0.12 | 0.08 | 0.06 |

PRESSURE SENSING MODULE, TOUCH PANEL AND METHOD OF DETECTING TWO-POINT TOUCH PRESSURE OF TOUCH PANEL

CROSS-REFERENCE TO RELATED APPLICATION

This application claims priority to China Application Serial Number 201810973194.1, filed Aug. 24, 2018, which is herein incorporated by reference.

BACKGROUND

Technical Field

The present disclosure relates to the field of touch displays, and in particular to a pressure sensing module, a touch panel and a method of detecting a two-point touch pressure of a touch panel.

Description of Related Art

In recent years, touch panels have become the main human-computer interaction means for personal mobile communication devices and integrated information terminals such as tablets, smart phones and ultrabooks due to their ease of use, intuitiveness and flexibility.

The existing touch panel only supports positional touch on the touch plane, that is, positional touch of X- and Y-axes, as well as sensing a single-point touch pressure perpendicular to the touch plane, i.e., Z-axis.

SUMMARY

A pressure sensing module at least includes a substrate and a sensing layer formed over the substrate. The sensing layer includes a plurality of pressure sensing units. The plurality of pressure sensing units are axially symmetrically disposed along a symmetry axis of the substrate to form a first pressure sensing region and a second pressure sensing region. The pressure sensitive unit includes four resistors having a same resistance. The four resistors constitute a Wheatstone bridge, in which pattern shapes of two of the resistors have a same extending direction and are not adjacent.

Preferably, the substrate is a rectangular substrate, and the pressure sensing units are disposed at four corners of the substrate. The pressure sensing unit at each corner is rectangular-shaped. There is a same included angle α between a first side or a second side of the pressure sensing unit and a side of X-axis direction of the substrate. Alternatively, there is a same included angle α between a first side or a second side of the pressure sensing unit and a side of Y-axis direction of the substrate.

Preferably, the included angle α ranges from 35° to 55°.
Preferably, the included angle α is 45°.
Preferably, the pattern shapes of the two resistors having the same extending direction are diagonally distributed.
Preferably, the two resistors that the pattern shapes having the same extending direction are defined as a first group of resistors, and the other two resistors are defined as a second group of resistors. Pattern shapes of the first group of resistors and the second group of resistors have different extending directions.

Preferably, the extending directions of the pattern shapes of the first group of resistors and the second group of resistors are perpendicular to each other.

The present disclosure further provides a touch panel. The touch panel includes the foregoing pressure sensing module and a touch sensing unit configured to detect a position information.

The present disclosure also provides a method of detecting a two-point touch pressure of a touch panel, which includes: step S1: providing the foregoing touch panel; step S2: applying a first touch force $F_A$ in the first pressure sensing region and applying a second touch force $F_B$ in the second pressure sensing region to sense touch positions of the first touch force $F_A$ and the second touch force $F_B$ and respectively acquire position information of touch points; step S3: respectively acquiring a first measured value $F_1$ of the pressure sensing unit in the first pressure sensing region and a second measured value $F_2$ of the pressure sensing unit in the second pressure sensing region, and when a known force F is applied on the touch panel, acquiring a component ratio $K_A$ of the force F at any touch point acquired by the pressure sensing unit in the first pressure sensing region and a component ratio $K_B$ of the force F at any touch point acquired by the pressure sensing unit in the second pressure sensing region; and step S4: according to positions of the touch points of the acquired first touch force $F_A$ and the second touch force $F_B$, the first measured value $F_1$ and the second measured value $F_2$, and fetching the component ratios $K_A$ and $K_B$ of the touch points corresponding to the first touch force $F_A$ and the second touch force $F_B$ to calculate the first touch force $F_A$ and the second touch force $F_B$. The component ratio $K_A$ of the touch point includes a proportional component $K_{A1}$ of each corresponding touch point of the first touch force $F_A$ in the first pressure sensing region and a proportional component $K_{A2}$ of each corresponding touch point of the second touch force $F_B$ in the second pressure sensing region. The component ratio $K_B$ of the touch point includes a proportional component $K_{B1}$ of each corresponding touch point of the first touch force $F_A$ in the first pressure sensing region and a proportional component $K_{B2}$ of each corresponding touch point of the second touch force $F_B$ in the second pressure sensing region:

$$F_A=(F_1*K_{B2}-F_2*K_{A2})/(K_{A1}*K_{B2}-K_{B1}*K_{A2});$$

$$F_B=(F_2*K_{A1}-F_1*K_{B2})/(K_{A1}*K_{B2}-K_{B1}*K_{A2}).$$

Preferably, values of $K_{A1}$ and $K_{A2}$ have a multivariate curve regular correlation with X-axis coordinate. The values of $K_{A1}$ and $K_{A2}$ are symmetric on Y-axis. The values of $K_{A1}$ and $K_{A2}$ are normalized.

Simultaneously, values of $K_{B1}$ and $K_{B2}$ have a multivariate curve regular correlation with the X-axis coordinate. The values of $K_{B1}$ and $K_{B2}$ are symmetric on the Y-axis. The values of $K_{B1}$ and $K_{B2}$ are normalized.

DETAILED DESCRIPTION

In order to make the objects, technical solutions and advantages of the present disclosure more clear, the present disclosure will be further described in detail below with reference to the accompanying drawings and embodiments. It is understood that the specific embodiments described herein are merely illustrative of the disclosure and are not intended to limit the present invention.

Figure 1A:
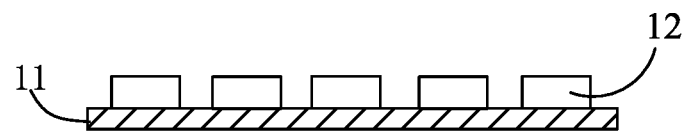
FIG. 1A is a cross-sectional structural view of a pressure sensing module according to at least one embodiment of the present disclosure.
Figure 1B:
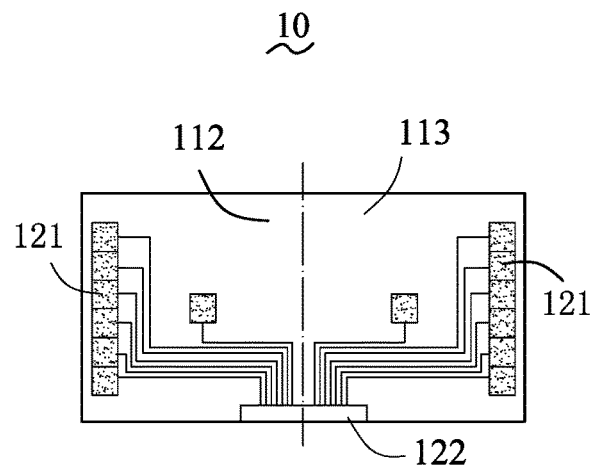
FIG. 1B is a plan structural view of the pressure sensing module according to at least one embodiment of the present disclosure.

Referring to FIGS. 1A-1B, a pressure sensing module 10 according to at least one embodiment of the present disclosure includes a substrate 11 and a pressure sensing layer 12 formed over a surface of the substrate 11. The pressure sensing layer 12 comprises a plurality of pressure sensing units 121 and a bonding area 122. The pressure sensing unit 121 may be a rectangular structure such as a rectangular-shaped or a square-shaped structure, and the pressure sensing units 121 are axially symmetrically distributed over the surface of the substrate 11, so that the substrate 11 forms two pressure sensing regions axisymmetric to each other, namely a first pressure sensing region 112 and a second pressure sensing region 113. The symmetry axis of the first pressure sensing region 112 and the second pressure sensing region 113 may be X-axis or Y-axis, which is not limited herein. Each of the pressure sensing units 121 in the first pressure sensing region 112 and the second pressure sensing region 113 is connected to the bonding area 122 by a signal connection line and electrically connected to an external detection circuit or chip through the bonding area 122 to achieve sensing of the pressure.

Figure 2A:
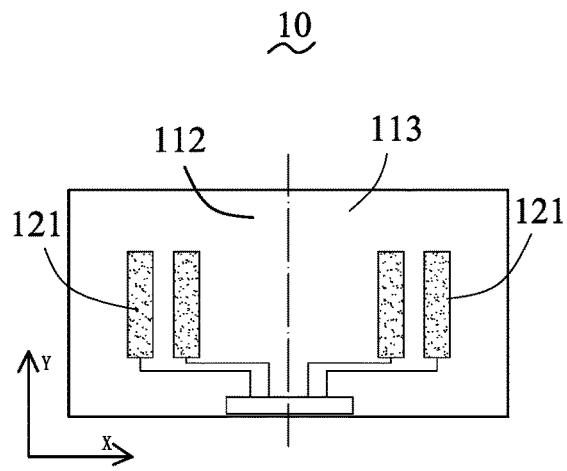
FIG. 2A is a structural view of a modified arrangement of a pressure sensing unit of the pressure sensing module according to at least one embodiment of the present disclosure.

Referring to FIG. 2A, the substrate 11 is rectangular-shaped. Four pressure sensing units 121 are disposed in a middle region of the substrate 11, in which two pressure sensing units 121 are disposed in the first pressure sensing region 112, and the other two pressure sensing units 121 are disposed in the second pressure sensing region 113. The sensing units 121 in the first pressure sensing region 112 and the second pressure sensing region 113 are axisymmetric on the Y-axis direction of the substrate 11.

Figure 2B:
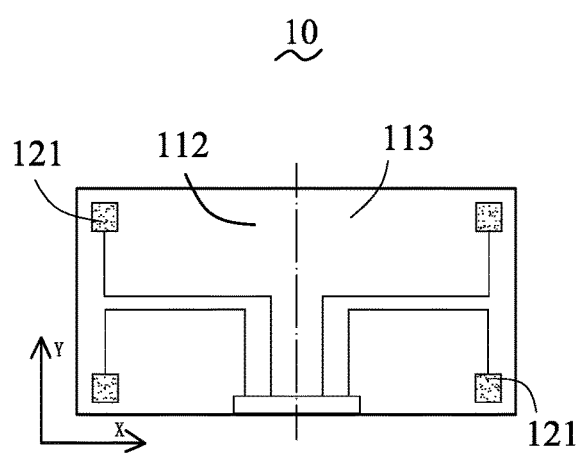
FIG. 2B is a structural view of another modified arrangement of a pressure sensing unit of the pressure sensing module according to at least one embodiment of the present disclosure.

Referring to FIG. 2B, the substrate 11 is rectangular-shaped, and four pressure sensing units 121 are disposed at four corners of the substrate 11, in which two pressure sensing units 121 are disposed in the first pressure sensing region 112, and the other two pressure sensing units 121 are disposed in the second pressure sensing region 113. The sensing units 121 in the first pressure sensing region 112 and the second pressure sensing region 113 are axisymmetric on the Y-axis direction of the substrate 11.

Figure 2C:
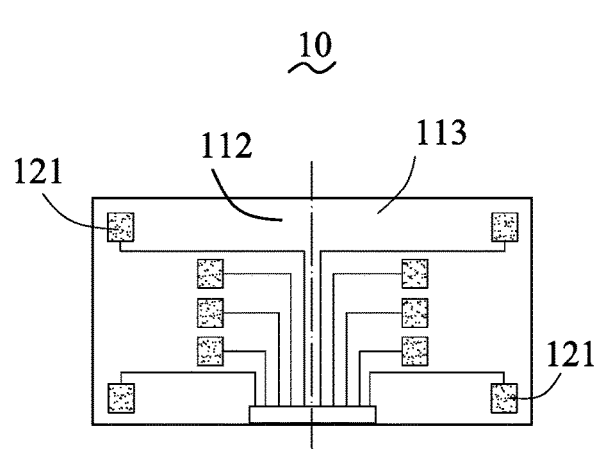
FIG. 2C is a structural view of another modified arrangement of a pressure sensing unit of the pressure sensing module according to at least one embodiment of the present disclosure.

Referring to FIG. 2C, the substrate 11 is rectangular-shaped, and ten pressure sensing units 121 are disposed over the substrate 11, in which two and the other two of four pressure sensing units 121 are symmetrically disposed at four corners of the substrate 11, and the remaining six pressure sensing units 121 are symmetrically distributed within the first pressure sensing region 112 and the second pressure sensing region 113.

Figure 3A:
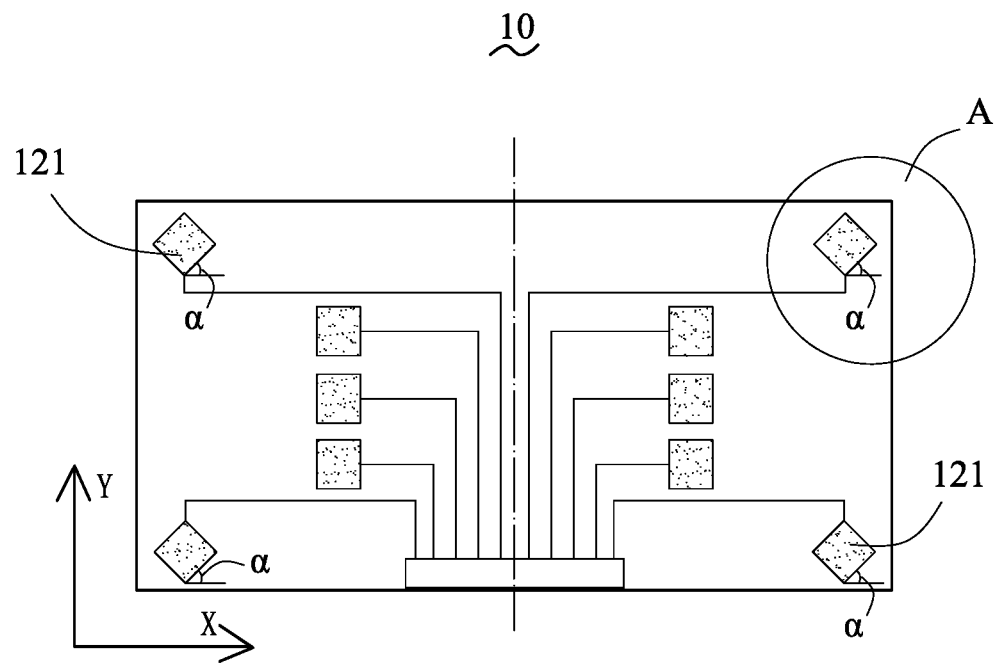
FIG. 3A is a structural view of a pressure sensing unit of the pressure sensing module after being rotated by an angle α and arranged on a substrate according to at least one embodiment of the present disclosure.
Figure 3B:
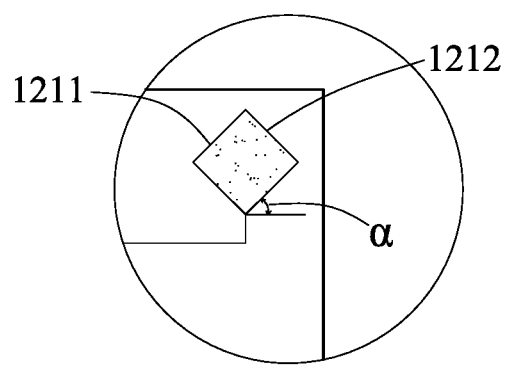
FIG. 3B is a partially enlarged view of FIG. 3A.

Referring to FIGS. 3A-3B, in some embodiments, the substrate 11 is rectangular-shaped, and when the four corners of the substrate 11 are correspondingly provided with the pressure sensing units 121, there is a same included angle α between a first side 1211 or a second side 1212 of the pressure sensing unit 121 at the four corners of the substrate 11 and a side of the X-axis direction of the substrate 11, or there is a same included angle α between a first side 1211 or a second side 1212 of the pressure sensing unit 121 at the four corners of the substrate 11 and a side of the Y-axis direction of the substrate 11. The included angle α ranges from 35° to 55°, preferably 45°. The pressure sensing units 121 located at four corners of the substrate 11 with the included angle α can let any two-point touch pressure value detected by the pressure sensing units 121 not offset each other or slightly offset, and thus the pressure sensing module 10 can more accurately measure the two-point touch pressure.

In summary, it is only necessary that the plural pressure sensing units 121 are axisymmetrically distributed over the surface of the substrate 11 along the X-axis and/or the Y-axis direction to define two symmetrically disposed pressure sensing regions. The number of pressure sensing units 121 is not limited.

Figure 4:
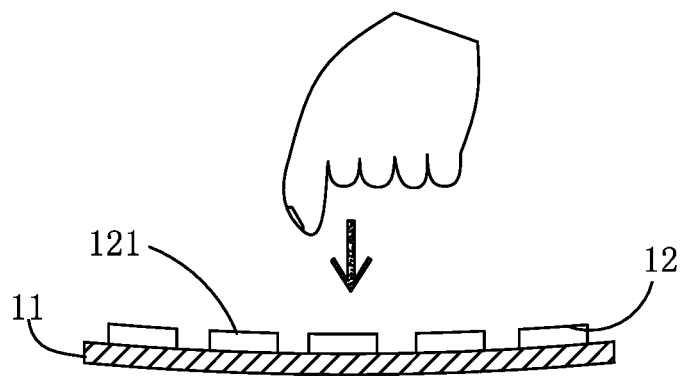
FIG. 4 is a structural view of deformation of the pressure sensing module according to at least one embodiment of the present disclosure.

Referring to FIG. 4, the pressure sensing module 10 is pressed by a finger, and the pressure sensing unit 121 over the pressure sensing layer 12 is deformed due to the pressing force, that is, the volume is changed, thereby affecting resistance of the pressure sensing unit 121, and thus resistance change of the pressure sensing unit 121 is acquired to obtain the pressing pressure of the finger.

Figure 5A:
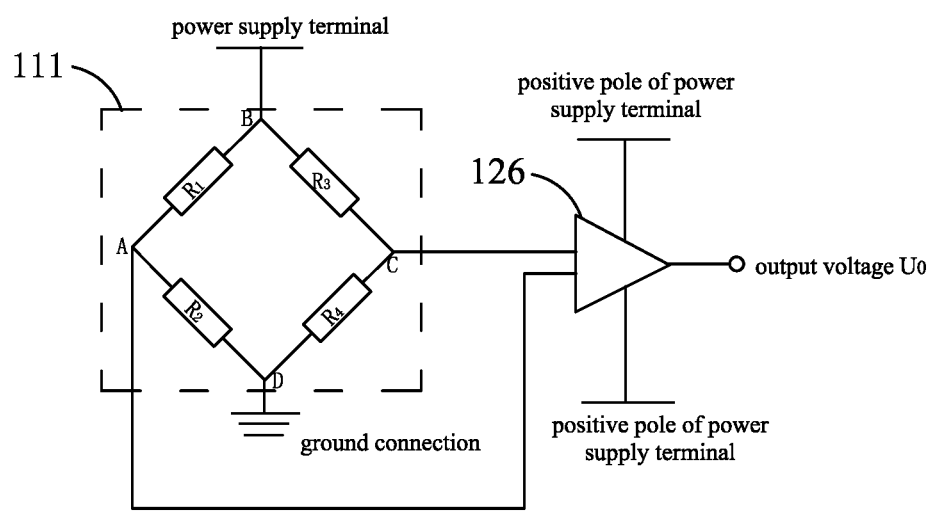
FIG. 5A is a structural view of a bridge circuit of a sensing unit in the pressure sensing module according to at least one embodiment of the present disclosure.
Figure 5B:
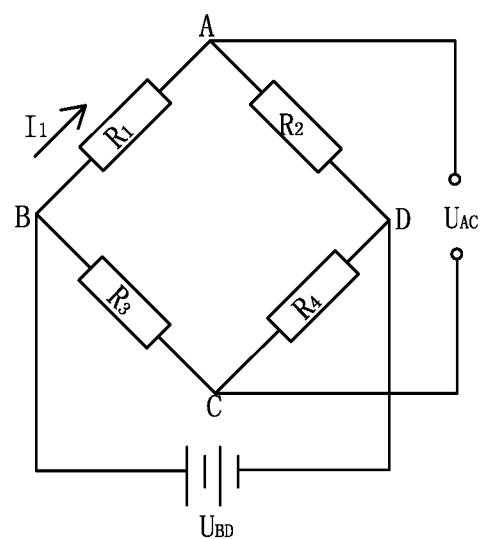
FIG. 5B is an equivalent circuit diagram of an equal-arm bridge in the pressure sensing module according to at least one embodiment of the present disclosure.

Referring to FIGS. 5A-5B, each of the pressure sensing units 121 is an independently arranged bridge 111, and the bridge 111 may be composed of four resistors. Resistances of the four resistors are the same. The four resistors are a resistor $R_1$, a resistor $R_2$, a resistor $R_3$, and a resistor $R_4$, in which the resistor $R_1$ is connected in series with the resistor $R_2$, and the resistor $R_3$ is connected in series with the resistor $R_4$, and the two serial circuits are connected in parallel to form a Wheatstone bridge. Further, a first power supply terminal is connected between the resistor $R_1$ and the resistor $R_3$, and a ground connection is connected between the resistor $R_2$ and the resistor $R_4$. As shown in FIG. 5A, the C terminal and the A terminal of the bridge 111 are connected to an amplifier 126 for signal output, and the amplifier 126 can be connected to a positive pole and a negative pole of a power supply.

As shown in FIG. 5B, the bridge 111 is in an equilibrium state when no touch force is applied. When subjected to a touch force, one or more bridges 111 near the pressed position are deformed to cause a change in resistance, and the Wheatstone bridge balance is broken to certainly cause change in output potential difference signal $U_O$ ($U_{AC}$ as shown in FIG. 5B). Different pressures correspond to different resistance values, and different potential difference signals are generated accordingly. Therefore, the corresponding pressure value can be obtained by calculating and processing the potential difference signal $U_O$ of the Wheatstone bridge.

The voltage drop across two terminals of the resistor $R_1$ can be expressed as:

$$U_{AB} = I_1 R_1 = \frac{R_1}{R_1 + R_2} U_{BD} \qquad (1)$$

The voltage drop across two terminals of the resistor $R_3$ can be expressed as:

$$U_{BC} = \frac{R_3}{R_3 + R_4} U_{BD} \qquad (2)$$

The voltage $U_O$ outputted from the bridge can be expressed as:

$$U_O = U_{AB} - U_{BC} = \frac{R_1 R_4 - R_2 R_3}{(R_1 + R_2)(R_3 + R_4)} U_{BD} \qquad (3)$$

It can be seen from formula (3) that when $R_1 R_4 = R_2 R_3$, the output voltage $U_O$ of the bridge 111 is equal to 0, and the bridge 111 is in the equilibrium state.

Further, assuming that the change in each bridge arm resistance of the bridge 111 in the equilibrium state is $\Delta R_1$, $\Delta R_2$, $\Delta R_3$, and $\Delta R_4$, the output voltage $U_O$ of the bridge 111 can be further expressed as:

$$U_O = U_{AB} - U_{BC} = \frac{(R_1 + \Delta R_1)(R_4 + \Delta R_4) - (R_2 + \Delta R_2)(R_3 + \Delta R_3)}{(R_1 + \Delta R_1 + R_2 + \Delta R_2)(R_3 + \Delta R_3)(R_4 + \Delta R_4)} U_{BD} \qquad (4)$$

If the equilibrium condition $R_1 R_4 = R_2 R_3$ is substituted into the above formula (4), and further considering that $\Delta R$ is much smaller than R to omit the high-order trace, the output voltage of the bridge is:

$$U_0 = U_{BD} \frac{R_1 R_2}{(R_1 + R_2)^2} \left( \frac{\Delta R_1}{R_1} - \frac{\Delta R_2}{R_2} - \frac{\Delta R_3}{R_3} + \frac{\Delta R_4}{R_4} \right) \quad (5)$$

In the present disclosure, the resistance values of the resistors of the bridge 111 are equal, that is, $R_1 = R_2 = R_3 = R_4 = R$, and therefore, the above formula (5) can be further expressed as:

$$U_0 = \frac{U_{BD}}{4} \left( \frac{\Delta R_1}{R_1} - \frac{\Delta R_2}{R_2} - \frac{\Delta R_3}{R_3} + \frac{\Delta R_4}{R_4} \right) \quad (6)$$

Further, if the four resistors (resistor $R_1$, resistor $R_2$, resistor $R_3$, and resistor $R_4$) in the bridge 111 are strain gauges, and their sensitivities K are the same, after the finger presses the pressure sensing layer 12, a relationship between a ratio of the resistance change caused by the finger pressing action to the initial resistance value of the corresponding resistor and the strain after the resistor is pressed is as follows:

$$\Delta R/R = K\varepsilon \quad (7)$$

The above formula (6) may be combined with the formula (7), and the output pressure $U_0$ of the bridge 111 can be further expressed as:

$$U_0 = \frac{U_{BD} K}{4} (\varepsilon_1 - \varepsilon_2 - \varepsilon_3 + \varepsilon_4) \quad (8)$$

As can be seen from the above formula (8), the output voltage $U_0$ of the bridge 111 is related to the strains of the four resistors. In order to further simplify the above formula (8), the bridge 111 includes two resistors that pattern shapes have a same extending direction.

Figure 6A:
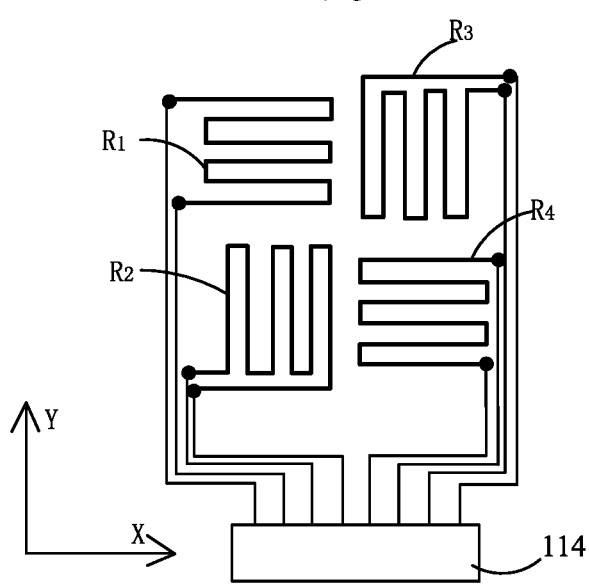
FIG. 6A is a structural view of pattern shapes of four resistors and their wires included in a bridge in the pressure sensing module according to at least one embodiment of the present disclosure.

Referring to FIG. 6A, both of the resistor $R_1$ and the resistor $R_4$, and both of the resistor $R_2$ and the resistor $R_3$ have pattern shapes having the same extending direction, so that the bridge 111 has the X-direction strain and the Y-direction strain consistent with the extending direction. The extending direction herein and below means that a total projection length of the pattern shape of the resistor in one direction is greater than a total projection length of the pattern shape of the resistor in other directions, and the direction is the extending direction of the pattern shape of the resistor.

Further, in order to form the Wheatstone bridge between the resistor $R_1$, the resistor $R_2$, the resistor $R_3$ and the resistor $R_4$ and to achieve electrical connections, in the embodiment, as shown in FIG. 6A, the pressure sensing module 10 further includes a bonding region 114, and the resistor $R_1$, the resistor $R_2$, the resistor $R_3$ and the resistor $R_4$ are independently wired to the bonding region 114.

Figure 6B:
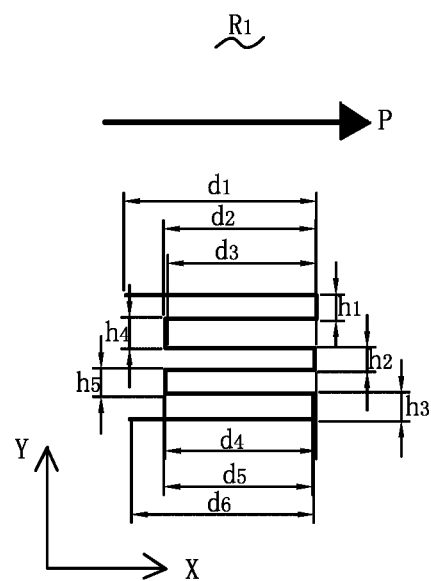
FIG. 6B is a schematic diagram of a total projection length of the resistor R1 in FIG. 6A.

Referring to FIG. 6B, taking the resistor $R_1$ shown in FIG. 6A as an example, total projection lengths of the pattern shape of the resistor can be divided into the total projection length d along the X direction and the total projection length h along the Y direction, in which the pattern shape of the resistor is divided into a plurality of segments along the X direction or the Y direction. As shown in FIG. 5B, the total projection length d along the X direction is equal to a sum of the line segment $d_1$, the line segment $d_2$, the line segment $d_3$, the line segment $d_4$, the line segment $d_5$, and the line segment $d_6$, and the total projection length h along the Y direction is equal to a sum of the line segment $h_1$, the line segment $h_2$, the line segment $h_3$, the line segment $h_4$, and the line segment $h_5$. As can be seen from FIG. 6B, the total projection length d along the X direction is larger than the total projection length h along the Y direction. Therefore, the direction in which the total projection length d of the resistor R1 along the X direction is located is the extending direction P of the resistor $R_1$.

According to the above method, extending directions corresponding to the resistor $R_2$, the resistor $R_3$ and the resistor $R_4$ can be respectively obtained, and specific steps are not described herein again.

In the present disclosure, the pattern shapes of the two resistors having the same extending direction are not adjacently disposed. That is, the extending direction of the resistor $R_1$ and the resistor $R_4$ is the direction in which the total projection length d along the X direction is located, and the resistor $R_1$ and the resistor $R_4$ are not adjacently disposed. The extending direction of the resistor $R_2$ and the resistor $R_3$ is the direction in which the total projection length h along the Y direction is located, and the resistor $R_2$ and the resistor $R_3$ are not adjacently disposed. The two resistors not adjacently disposed described herein and below can be understood that the two resistors are not adjacently disposed along the X direction or along the Y direction.

Further, the pattern shapes of the two resistors having the same extending direction are diagonally distributed. That is, specifically, the resistor $R_1$ and the resistor $R_4$ are diagonally disposed, and the resistor $R_2$ and the resistor $R_3$ are diagonally disposed.

In some preferred embodiments, the two resistors of the pressure sensing unit 121 (i.e., the bridge 111) having the same extending direction are defined as a first group of resistors, and the other two resistors are defined as a second group of resistors, and the extending direction of pattern shapes of the first group of resistors is different from the extending direction of pattern shapes of the second group of resistors. That is, the first group of resistors includes the resistor $R_1$ and the resistor $R_4$, and the second group of resistors includes the resistor $R_2$ and the resistor $R_3$.

More preferably, the extending direction of the pattern shapes of the first group of resistors and that of the second group of resistors are perpendicular to each other. That is, the extending direction of the pattern shapes of the resistor $R_1$ and the resistor $R_4$ and that of the resistor $R_2$ and the resistor $R_3$ are perpendicular to each other. Specifically, the total projection lengths of the pattern shapes of the resistor R1 and the resistor $R_4$ along a first direction are greater than the total projection lengths of the pattern shapes of the resistor $R_1$ and the resistor $R_4$ along a second direction, and the total projection lengths of the pattern shapes of the resistors $R_2$ and the resistor $R_3$ along the second direction are greater than the total projection lengths of the pattern shapes of the resistor $R_2$ and the resistor $R_3$ along the first direction, in which the first direction is perpendicular to the second direction.

In the present embodiment, only one pressure sensing unit 121 (i.e., the bridge 111) in the pressure sensing layer 12 is used to illustrate the specific layout and structural relationship of the resistors. At the practical application level, the pressure sensing layer 12 may include one or more pressure sensing units 121 having different resistor pattern shapes or distributions.

In this embodiment, each of the resistors (resistor $R_1$, resistor $R_2$, resistor $R_3$, and resistor $R_4$) is formed of a metal wire. The material of the metal wire includes, but is not limited to, any one or a combination of copper, silver, aluminum, gold, etc., and the metal wire includes a material whose resistance change is mainly caused by volume change after being pressed by a finger, that is, the material can sense the strains along the first direction and the second direction after the bridge 111 is subjected to the finger touch force.

Referring to FIG. 1 and FIG. 6A, specifically, the first direction corresponds to the X direction, and the second direction corresponds to the Y direction. The four resistors in the first pressure sensing unit 121 (i.e., the bridge 111) are arranged in an array and are all formed over the substrate 11 by etching. In the single bridge 111, one of the two resistors disposed diagonally (i.e., the resistor $R_1$ and the resistor $R_4$) adopts a comb-line shape with the first direction (X-direction) acted as the extending direction, and the other of the two resistors disposed diagonally (i.e., the resistor $R_2$ and the resistor $R_3$) adopts a comb-line shape with the second direction (Y-direction) acted as the extending direction. By adopting such design, changes of the resistance values of the bridge 111 along the X-direction and the Y-direction may be different, thereby increasing the voltage output value of the bridge 111. Since the four resistors in the bridge 111 are relatively close, the degree of heat and the degree of stress are substantially same, and therefore, it is not easy to cause a single resistor to be unevenly heated or stressed.

Further, as shown in FIG. 6A, if the distance between the comb-line shaped resistors is too large, the influence of temperature on the four resistors is inconsistent, and thus the strains caused by temperature are not the same. Therefore, the output voltage $U_0$ due to temperature is not zero, thereby affecting the balance of the bridge. However, if the distance between the comb-line shaped resistors is too small, the signal-to-noise ratio of the change signal caused by the touch force after the finger is pressed may be affected. Therefore, in order to obtain a better sensing effect, in the present disclosure, the distance between the pattern shapes of two adjacent resistors of the resistor $R_1$, the resistor $R_2$, the resistor $R_3$, and the resistor $R_4$ is maintained in a range of from 0.01 mm to 2 mm to make the heating uniformity of the same region better.

In this embodiment, since the resistance values of the resistor $R_1$, the resistor $R_2$, the resistor $R_3$, and the resistor $R_4$ of the bridge 111 are the same, and by assuming that the resistance changes caused by the touch force pressed by the finger and the temperature changes of the four resistors are the same, according to the formula (7) $\Delta R/R = K\varepsilon$ (K is sensitivity), it can be seen that the relationship between the strains generated by the electric resistor $R_1$, the resistor $R_2$, the resistor $R_3$ and the resistor $R_4$ after being pressed by the finger can be expressed as: $\varepsilon_1 = \varepsilon_4 = \varepsilon_x$, and $\varepsilon_2 = \varepsilon_3 = \varepsilon_y$. Therefore, the above formula (8) can be further converted into:

$$U_0 = \frac{U_{BD}K}{4}(\varepsilon_x - \varepsilon_y - \varepsilon_y + \varepsilon_x) = \frac{U_{BD}K}{2}(\varepsilon_x - \varepsilon_y) \qquad (9)$$

As can be seen from the above formula (9), the voltage $U_{BD}$ can be obtained by measurement. K is resistance sensitivity related to the material of the metal wire. The strain in the X-direction of the bridge 111 after being pressed is expressed as $\varepsilon_x$ and the strain in the Y-direction of the bridge 111 after being pressed is expressed as $\varepsilon_y$. The strains can be obtained from the measurement of the resistor strain gauges.

It can be seen that the output voltage $U_0$ of the bridge 111 obtained by the above formula (9) is related to the absolute value of the difference between the strain $\varepsilon_x$ in the X direction and the strain $\varepsilon_y$ in the Y direction after the bridge 111 is pressed by the finger.

In some embodiments, in order to increase the difference between the strain $\varepsilon_x$ in the X direction and the strain $\varepsilon_y$ in the Y direction after the bridge 111 is pressed by the finger, the aspect ratio of the pressure sensing layer 12 may be further set to be different. That is, the length of the sensing layer 12 along the X direction is different from the length thereof along the Y direction.

Figure 7A:
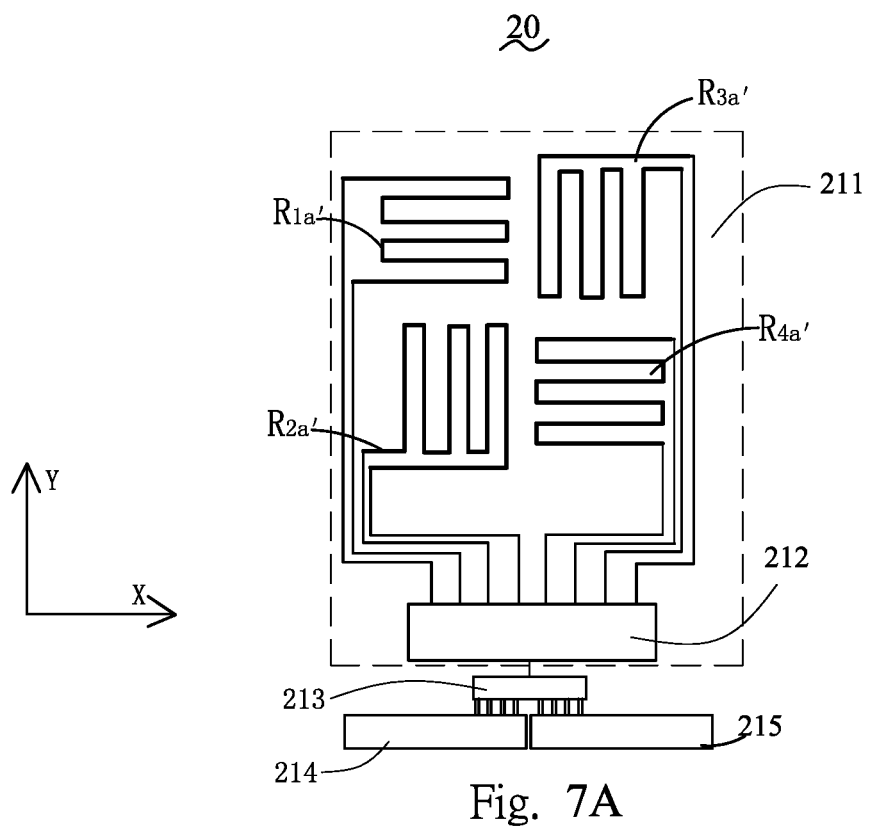
FIG. 7A is a schematic diagram of a modified structure of the pressure sensing module according to at least one embodiment of the present disclosure.
Figure 7B:
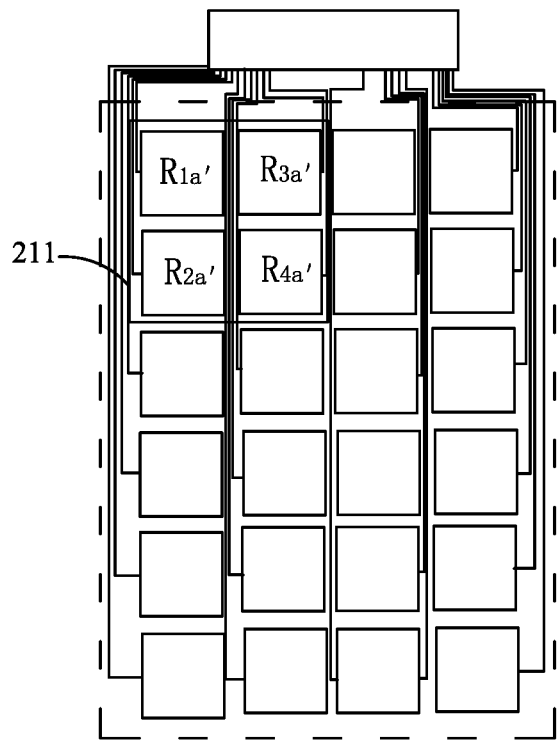
FIG. 7B is a structural view of connections of a plurality of pressure sensing modules.

Referring to FIG. 7A and FIG. 7B, in some embodiments, the pressure sensing module 20 includes a pressure sensing unit 211, a selection chip 213, a pressure sensing circuit 214, and a touch sensing circuit 215.

Specifically, in the pressure sensing module 20, a plurality of pressure sensing units 211 are arranged in an array over a surface of a substrate (not shown). Each of the pressure sensing units 211 is an independently disposed bridge 211, and the bridge 211 includes four resistors, which are resistor $R1a'$, resistor $R2a'$, resistor $R3a'$, and resistor $R4a'$. The four resistors are electrically connected to the bonding region 212 and further connected to the selection chip 213 through the bonding region 212. The selection chip 213 further includes a selection switch (not shown), and the selection switch is electrically connected to a pressure sensing circuit 214 and a touch sensing circuit 215.

In order to achieve pressure and touch sensing, preferably, scanning is performed by means of time-sharing scanning. That is, when the scanning period is pressure sensing (i.e., the first timing), the selection switch in the selection chip 213 is switched to turn on the pressure sensing circuit 214, and thus the resistor $R1a'$, the resistor $R2a'$, the resistor $R3a'$ and the resistor $R4a'$ are connected to the pressure sensing circuit 214. After the finger is pressed, volumes of the resistor $R1a'$, the resistor $R2a'$, the resistor $R3a'$ and the resistor $R4a'$ are varied, causing changes in strain and resistance values, and the touch force can be sensed according to the strains.

When the scanning period is touch sensing (i.e., the second timing), the selection switch (not shown) in the selection chip 213 is biased toward the touch sensing circuit 215, and thus the resistor $R1a'$, the resistor $R2a'$, the resistor $R3a'$, and the resistor $R4a'$ are electrically connected to the touch sensing circuit 215 to sense the finger pressing position by using a self-capacitance sensing manner.

Further, in order to improve the sensing effect of the pressure sensing module, an arrangement of the plurality of bridges 211 as shown in FIG. 7B is provided. The plurality of bridges 211 are distributed in an array and only disposed over one surface of the substrate. Multi-point pressure touch sensing can be further achieved through such design and using the time-sharing method.

Figure 8A:
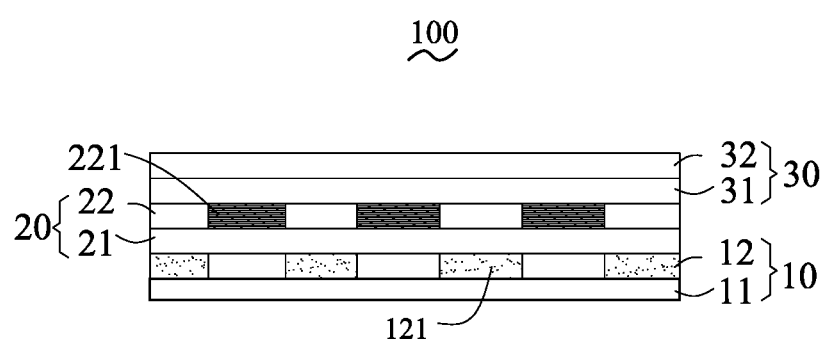
FIG. 8A is a structural view of a touch panel according to at least one embodiment of the present disclosure.

Referring to FIG. 8A, a second embodiment of the present disclosure provides a touch panel 100, which includes a pressure sensing module 10, a touch sensing module 20, and a display module 30. The touch sensing module 20 is disposed between the pressure sensing module 10 and the display module 30.

Specifically, the pressure sensing module 10 has the same structure and functions as the pressure sensing module provided in the first embodiment. That is, the pressure sensing module 10 includes a substrate 11 and a pressure sensing layer 12 formed over a surface of the substrate 11. The pressure sensing layer 12 is provided with a plurality of pressure sensing units 121 and a bonding area (not shown). A plurality of pressure sensing units 121 are axially symmetrically distributed over the surface of the substrate 11.

Each of the pressure sensing units 121 is connected to the bonding area by a signal connection line and is electrically connected to an external detection circuit or chip through the bonding area to achieve sensing of the pressure.

The touch sensing module 20 includes a touch substrate 21 and a touch sensing layer 22 formed over a surface of the touch substrate 21. The touch sensing layer 22 is provided with touch sensing units 221 distributed in an array. Each of the touch sensing units 221 is connected to a bonding area (not shown) through a signal connection line and is electrically connected to the external detection circuit or chip through the bonding area to achieve sensing of the touch position.

The display module 30 includes a display substrate 31 and a display layer 32 formed over the display substrate 31. Preferably, the display module 30 is an OLED display module.

Figure 8B:
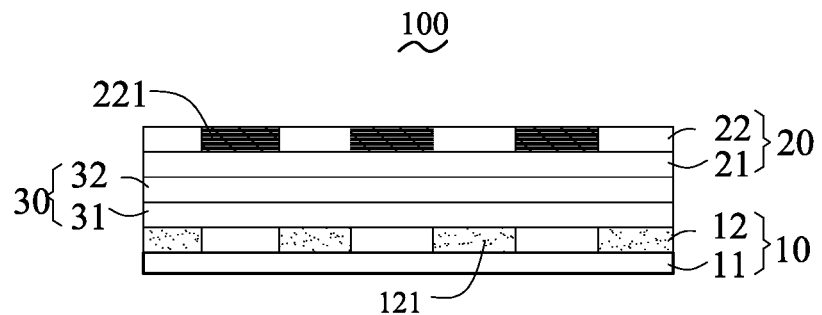
FIG. 8B is a schematic diagram of a modified structure of the touch panel according to at least one embodiment of the present disclosure.

Referring to FIG. 8B, in some embodiments, the display module 30 is disposed between the touch sensing module 20 and the pressure sensing module 10. That is, the display module 30 is disposed between a side of the touch substrate 21 away from the touch sensing layer 22 and the pressure sensing module 10. Preferably, the display module 30 is an OLED display module.

Figure 8C:
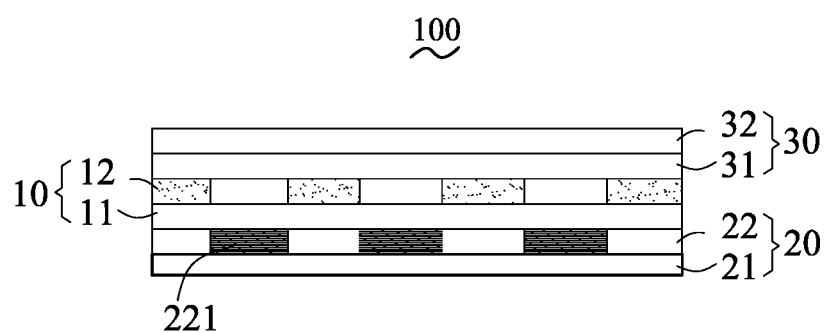
FIG. 8C is a schematic diagram of another modified structure of the touch panel according to at least one embodiment of the present disclosure.

Referring to FIG. 8C, in some embodiments, the pressure sensing module 10 is disposed between the display module 30 and the touch sensing module 20. That is, the pressure sensing module 10 is disposed between a side of the display substrate 31 away from the display layer 32 and the touch sensing module 20. Preferably, the display module 30 is an OLED display module.

Figure 8D:
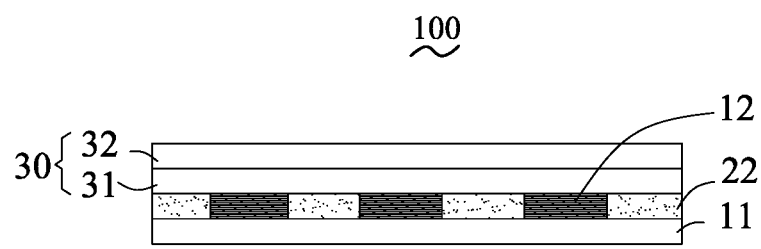
FIG. 8D is a schematic diagram of another modified structure of the touch panel according to at least one embodiment of the present disclosure.
Figure 9:
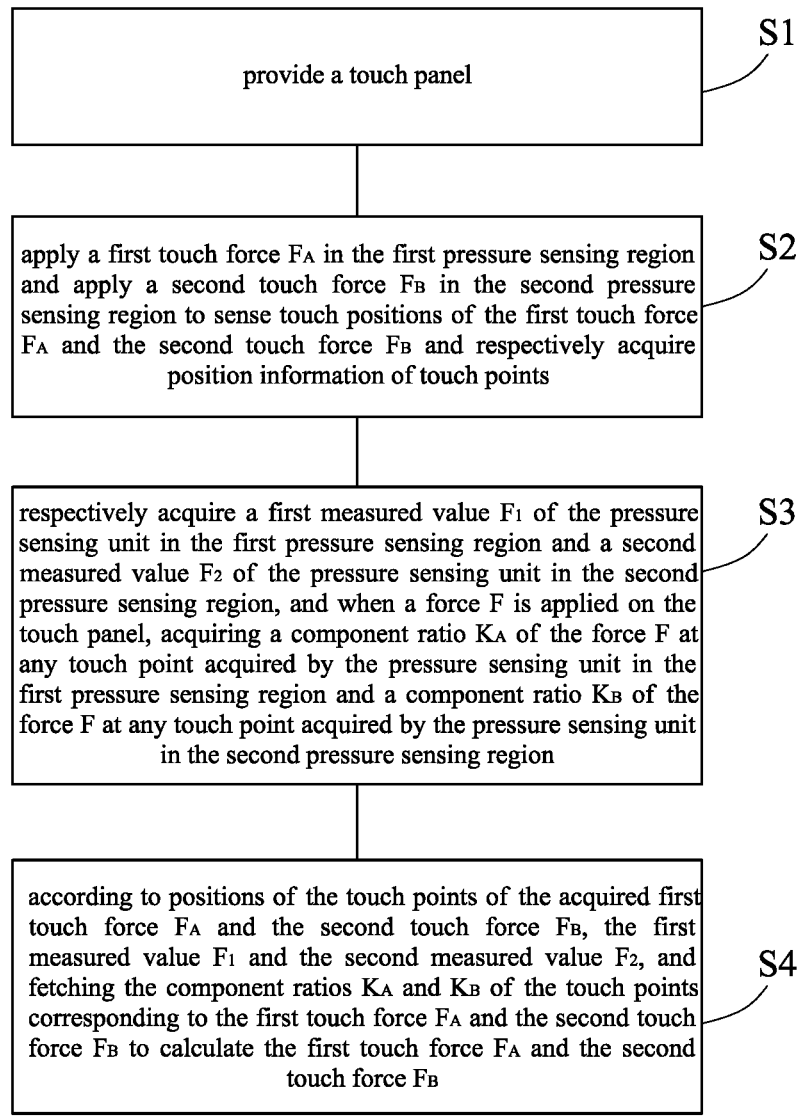
FIG. 9 is a flowchart of a method of detecting a two-point touch pressure of a touch panel according to at least one embodiment of the present disclosure.

Referring to FIG. 8D, in some embodiments, the pressure sensing module 10 is disposed beneath the display module 30, and the pressure sensing layer 12 and the touch sensing layer 22 are disposed in the same layer to share a substrate 11. Referring to FIG. 9, a third embodiment of the present disclosure provides a method of detecting a two-point touch pressure of a touch panel, which includes the following steps.

Step S1: a first touch force $F_A$ is applied in the first pressure sensing region and a second touch force $F_B$ is applied in the second pressure sensing region to sense touch positions of the first touch force $F_A$ and the second touch force $F_B$ and respectively acquire position information of touch points.

Figure 10A:
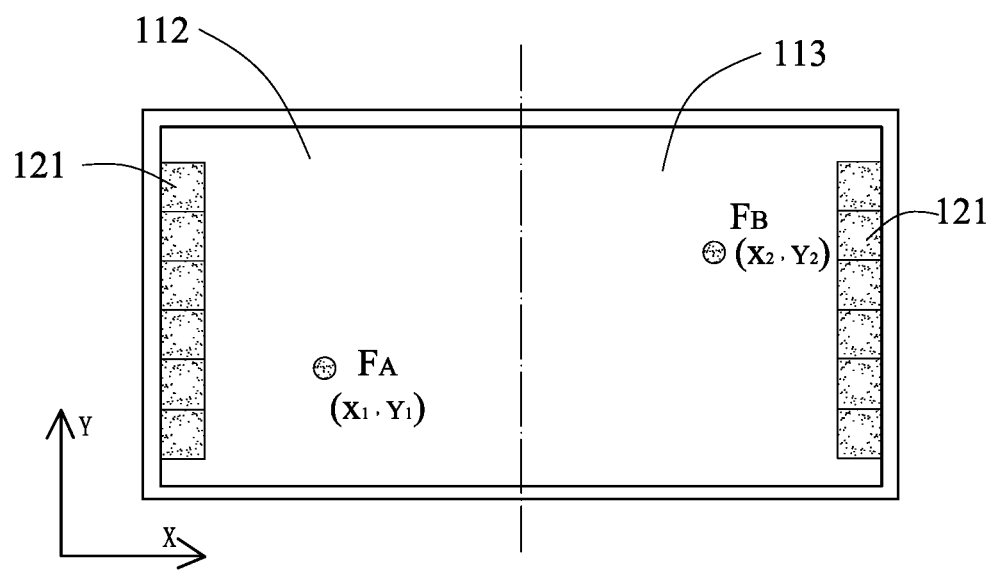
FIG. 10A is a structural view of a distribution of an internal pressure sensing unit of a touch panel.

Referring to FIG. 10A, the touch panel 100 is provided. The touch panel 100 is provided with a plurality of pressure sensing units 121. The pressure sensing units 121 are axially symmetrically disposed with respect to the substrate 11. The symmetry axis may be the X-axis or the Y-axis. The axisymmetric arrangement of the pressure sensing units 121 defines the first pressure sensing region 112 and the second pressure sensing region 113 of the touch panel 100. That is, the touch panel 100 defines the first pressure sensing region 112 and the second pressure sensing region 113 axisymmetric to each other along the X-axis or the Y-axis.

When the user performs single-finger touch in the first pressure sensing region 112 and the second pressure sensing region 113 respectively. That is, when the user applies the first touch force $F_A$ in the first pressure sensing region 112 and the second touch force $F_B$ in the second pressure sensing region 113, positions of the touch points are respectively acquired. The touch point acting on the first pressure sensing region 112 is $(X_1, Y_1)$, that is, the position of the touch point of the first touch force $F_A$ is $(X_1, Y_1)$. The touch point acting on the second pressure sensing region 113 is $(X_2, Y_2)$, that is, the position of the touch point of the second touch force $F_B$ is $(X_2, Y_2)$.

Step S2: a first measured value $F_1$ of the pressure sensing unit in the first pressure sensing region and a second measured value $F_2$ of the pressure sensing unit in the second pressure sensing region are respectively acquired. The first measured value $F_1$ is the sum of a component $F_{A(component\ 1)}$ of the first touch force $F_A$ in the first pressure sensing region 112 and a component $F_{B(component\ 1)}$ of the second touch force $F_B$ in the first pressure sensing region 112. That is, $F_1 = F_{A(component\ 1)} + F_{B(component\ 1)}$. The second measured value F2 is the sum of a component $F_{B(component\ 2)}$ of the second touch force $F_B$ in the second pressure sensing region 113 and a component $F_{A(component\ 2)}$ of the first touch force $F_A$ in the second pressure sensing region 113. That is, $F_2 = F_{B(component\ 2)} + F_{A(component\ 2)}$.

When a force F is applied to the touch panel, a component ratio $K_A$ of the force F at any touch point acquired by the pressure sensing unit in the first pressure sensing region and a component ratio $K_B$ of the force F at any touch point acquired by the pressure sensing unit in the second pressure sensing region, in which $$F_1 = F_{A(component\ 1)} + F_{B(component\ 1)} = F_A * K_{A1} + F_B * K_{A2} \quad (1)$$

$$K_{A1} = f_A(x_1) * f_A(y_1) \quad (2)$$

$$K_{A2} = f_A(x_2) * f_A(y_2) \quad (3)$$

$$F_2 = F_{B(component\ 2)} + F_{A(component\ 2)} = F_B * K_{B2} + F_A * K_{B1} \quad (4)$$

$$K_{B1} = f_B(x_1) * f_B(y_1) \quad (5)$$

$$K_{B2} = f_B(x_2) * f_B(y_2) \quad (6)$$

That is, $K_A = f_A(x) * f_A(y), K_B = f_B(x) * f_B(y)$.

$F_A * K_{A1}$ is the touch intensity obtained by the pressure sensing unit in the first pressure sensing region when the touch force $F_A$ is applied at the coordinate $(X_1, Y_1)$.

$F_B * K_{A2}$ is the touch intensity obtained by the pressure sensing unit in the first pressure sensing region when the touch force $F_B$ is applied at the coordinate $(X_2, Y_2)$.

$F_B * K_{B2}$ is the touch intensity obtained by the pressure sensing unit in the second pressure sensing region when the touch force $F_B$ is applied at the coordinate $(X_2, Y_2)$.

$F_A * K_{B1}$ is the touch intensity obtained by the pressure sensing unit in the second pressure sensing region when the touch force $F_A$ is applied at the coordinate $(X_1, Y_1)$.

$K_A$ is the component ratio of the force F acquired by the pressure sensing unit in the first pressure sensing region when the force F is applied to any touch point in the touch sensing region on the touch panel.

$K_B$ is the component ratio of the force F acquired by the pressure sensing unit in the second pressure sensing region when the force F is applied to any touch point in touch sensing region on the touch panel.

The component ratio $K_A$ of the touch point includes a proportional component $K_{A1}$ of each corresponding touch point of the first touch force $F_A$ in the first pressure sensing region and a proportional component $K_{A2}$ of each corresponding touch point of the second touch force $F_B$ in the second pressure sensing region.

Figure 10B:
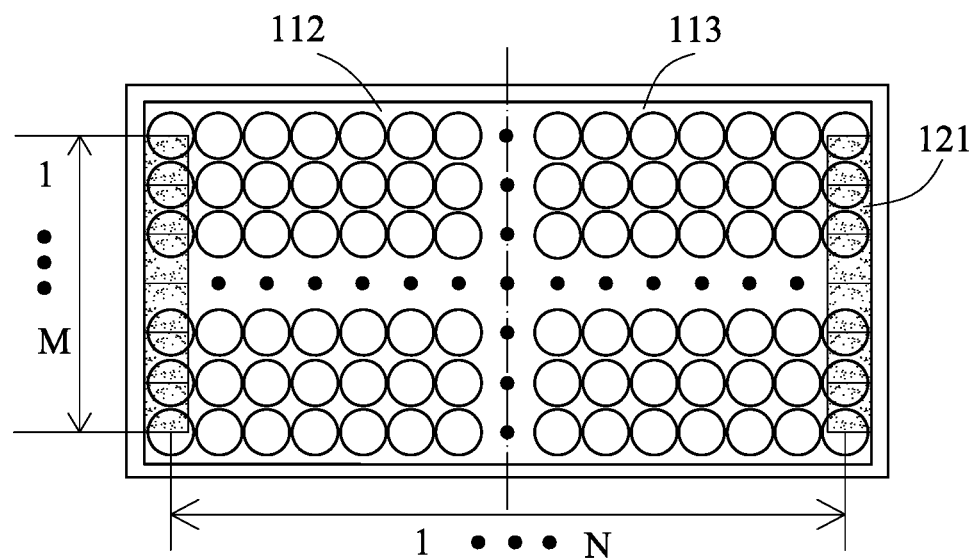
FIG. 10B is a structural view of a distribution of an internal touch sensing unit of a touch panel.

The component ratio $K_B$ of the touch point includes a proportional component $K_{B1}$ of each corresponding touch point of the first touch force $F_A$ in the first pressure sensing region and a proportional component $K_{A2}$ of each corresponding touch point of the second touch force $F_B$ in the second pressure sensing region. Referring to FIG. 10B, the touch panel has M*N touch sensing units, and the touch sensing units are distributed in an array in the first pressure sensing region 112 and the second pressure sensing region 113 for detecting the touch position. When the user's finger acts on the touch panel, the corresponding touch sensing unit can acquire the touch sensing signals to obtain the position of the touch point, in which N≥M, and N and M are both positive integers.

Figure 11A:
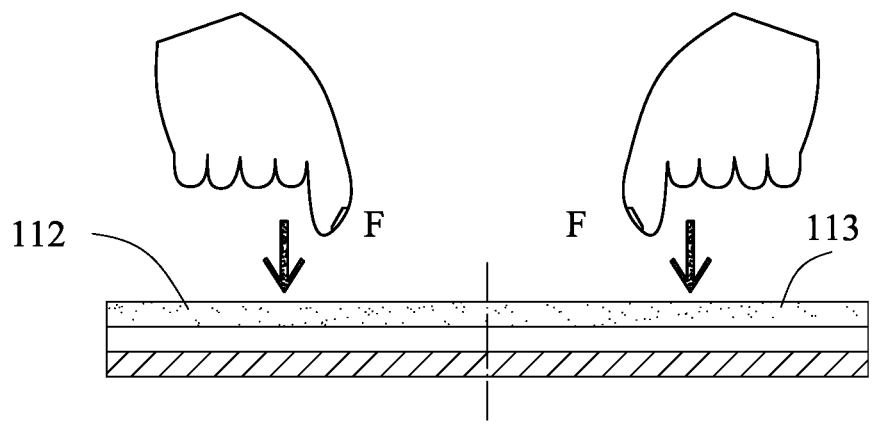
FIG. 11A is a structural view of a touch force applied to a touch panel.
Figures 11B, 11C:
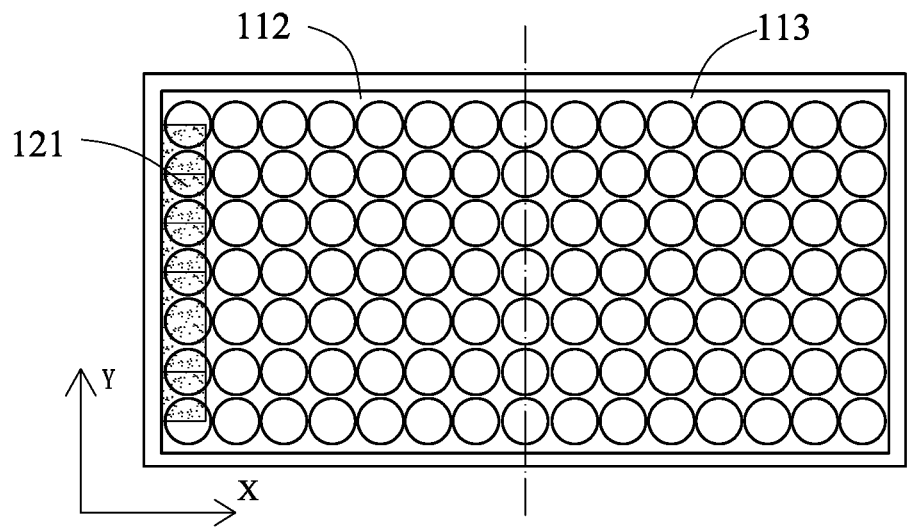
FIG. 11B is a structural view of a pressure sensing unit in a first pressure sensing region of the touch panel for detecting an applied touch force.
FIG. 11C is a structural view of a distribution of a component ratio $K_A$ of a corresponding touch point detected by the pressure sensing unit in the first pressure sensing region when a fixed value of pressure is applied to each touch sensing unit on the touch panel.

Referring to FIGS. 11A-11C, there are M*N touch sensing units distributed in an array over the touch panel. In this embodiment, touch sensing units distributed in a 7×15 array are taken as an example, that is, there are A-G rows and 1-15 columns.

A fixed value of touch force F is applied to each touch point over the touch panel to obtain $K_{A1}$, $K_{A2}$ of each touch point detected by the pressure sensing unit 121 in the first pressure sensing region 112 and $K_{B1}$, $K_{B2}$ of each touch point detected by the pressure sensing unit 121 in the second pressure sensing region 113.

Specifically, as shown in FIG. 11B, when the pressure sensing unit 121 in the first pressure sensing region 112 operates, a fixed value of touch force F is applied to each touch sensing unit of the touch panel. When the touch force F is applied to the corresponding touch sensing unit, a ratio of the pressure value detected by the pressure sensing unit 121 to the applied touch force F is the component ratio corresponding to the touch sensing unit, that is, the $K_{A1}$ value or the $K_{A2}$ value. That is, when the touch sensing unit in the first pressure sensing region 112 is pressed with the touch force F, the ratio of the pressure value detected by the pressure sensing unit 121 to the applied touch force F is $K_{A1}$ of the corresponding position. When the touch sensing unit in the second pressure sensing region 113 is pressed with the touch force F, the ratio of the pressure value detected by the pressure sensing unit 121 to the applied touch force F is $K_{A2}$ of the corresponding position.

Figure 11D:
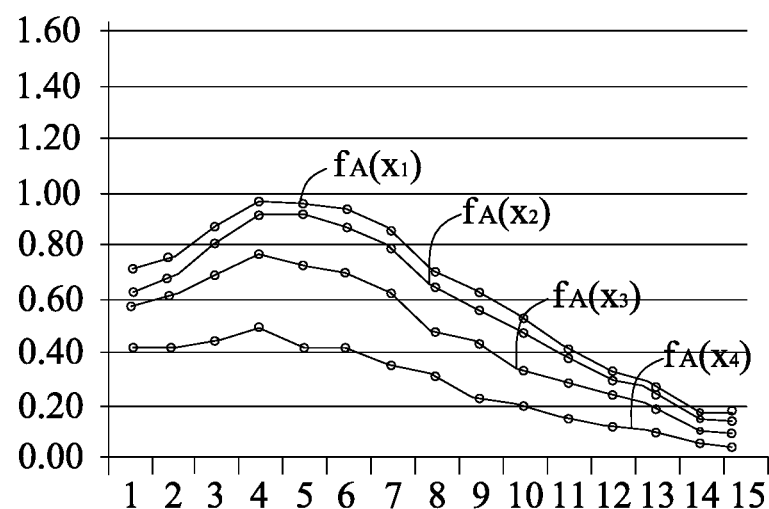
FIG. 11D is a schematic diagram of a relationship between the component ratio $K_A$ of the corresponding touch point detected by the pressure sensing unit in the first pressure sensing region and X-axis when a fixed value of pressure is applied to each touch sensing unit of the touch panel.

As shown in FIGS. 11C-11D, a fixed value of touch force F is applied to each touch sensing unit of the touch panel, and the component ratio $K_{A1}$ of each touch sensing unit of the first pressure sensing region 112 and the component ratio $K_{A2}$ of each touch sensing unit of the second pressure sensing region 113 are obtained. $K_{A1}$ and $K_{A2}$ of the touch sensing units of each row and X-axis coordinate satisfy the following equation $f_A(x)$:

$$f_A(x)=ax^3+bx^2+cx+d \qquad (7),$$

in which a, b, c, and d are known constants, and these constants can be obtained by fitting the calculation program.

$K_{A1}$ and $K_{A2}$ of row A are approximately equal to $K_{A1}$ and $K_{A2}$ corresponding to row G, and both satisfy $f_A(x_4)=a_4x_4^3+b_4x_4^2+b_4x_4^2+c_4x_4+d_4$.

$K_{A1}$ and $K_{A2}$ of row B are approximately equal to $K_{A1}$ and $K_{A2}$ corresponding to row F, and both satisfy $f_A(x_3)=a_3x_3^3+b_3x_3^2+c_3x_3+d_3$.

$K_{A1}$ and $K_{A2}$ of row C are approximately equal to $K_{A1}$ and $K_{A2}$ corresponding to row E, and both satisfy $f_A(x_2)=a_2x_2^3+b_2x_2^2+c_2x_2+d_2$.

$K_{A1}$ and $K_{A2}$ of row D satisfy $f_A(x_1)=a_1x_1^3+b_1x_1^2+c_1x_1+d_1$.

That is, when a fixed value of touch force F is applied to each touch sensing unit of the touch panel, the component ratios $K_{A1}$ and $K_{A2}$ of each touch sensing unit acquired by the pressure sensing unit 121 in the first pressure sensing region 112 have a multivariate curve regular correlation with the X-axis coordinate.

Figure 11E:
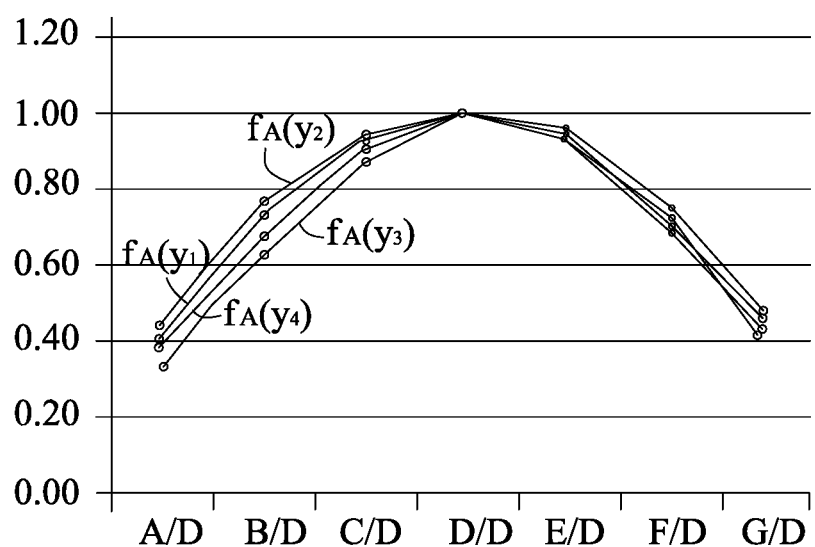
FIG. 11E is a functional relationship diagram between the touch pressure detected by the pressure sensing unit in the first pressure sensing region and the Y-axis when a fixed value of pressure is applied to each touch sensing unit on the touch panel.

As shown in FIG. 11E, $K_{A1}$ and $K_{A2}$ of the touch sensing units of each column and the Y-axis coordinate satisfy the following equation $f_A(y)$:

$$f_A(y)=Ay^2+By+C \qquad (8),$$

in which A, B, and C are constants. These constants can be obtained by fitting the calculation program, and $f_A(y)$ is symmetric on the Y-axis.

Further, the ratio of $K_{A1}$ and $K_{A2}$ of row A to $K_{A1}$ and $K_{A2}$ corresponding to row D satisfies $f_A(y_1)=A_1y_1^2+B_1y_1+C_1$.

The ratio of $K_{A1}$ and $K_{A2}$ of row B to $K_{A1}$ and $K_{A2}$ corresponding to row D satisfies $f_A(y_2)=A_2y_2^2+B_2y_2+C_2$.

The ratio of $K_{A1}$ and $K_{A2}$ of row C to $K_{A1}$ and $K_{A2}$ corresponding to row D satisfies $f_A(y_3)=A_3y_3^2+B_3y_3+C_3$.

That is, when a fixed value of touch force F is applied to each touch sensing unit of the touch panel, the component ratios $K_{A1}$ and $K_{A2}$ of the touch sensing unit acquired by the pressure sensing unit 121 in the first pressure sensing region 112 are symmetric on the Y-axis, and the values of $K_{A1}$ and $K_{A2}$ are normalized, that is, the values of $K_{A1}$ and $K_{A2}$ gradually decrease from the middle to the two sides on the Y-axis.

Figure 11F:
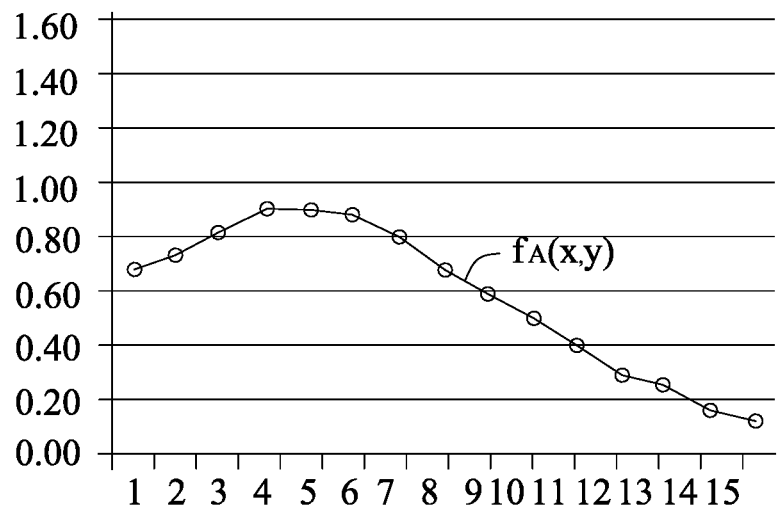
FIG. 11F is a functional relationship diagram between a relationship between the component ratio $K_A$ of the touch point detected by the pressure sensing unit in the first pressure sensing region and the X-axis, and a product of the touch pressure and the function of the Y-axis.

Please refer to FIG. 11F, it is known from the foregoing formulas (2) and (3):

$$K_A=f_A(x)*f_A(y) \qquad (9).$$

That is, $K_{A1}=f_A(x_1)*f(y_1)$ and $K_{A2}=f_A(x_2)*f(y_2)$

Figure 12A:
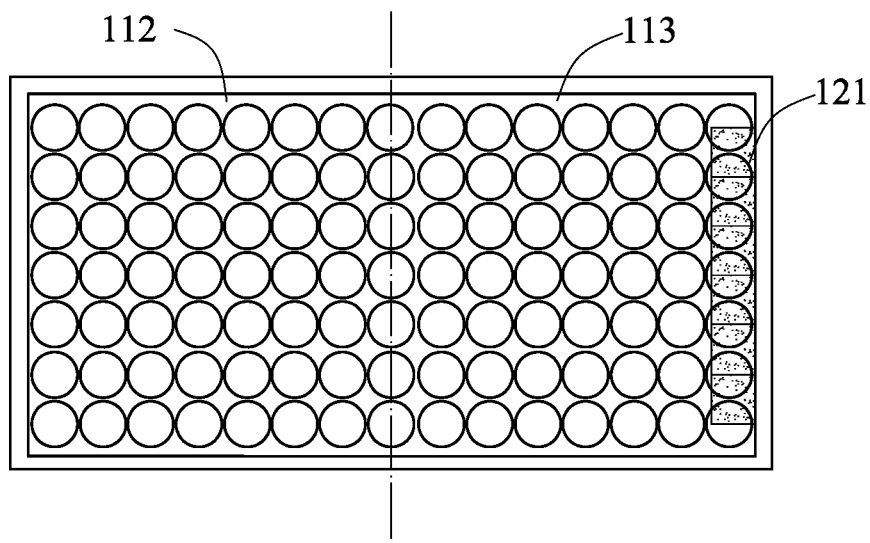
FIG. 12A is a structural view of a pressure sensing unit in a second pressure sensing region of a touch panel for detecting an applied touch force.
Figure 12B:
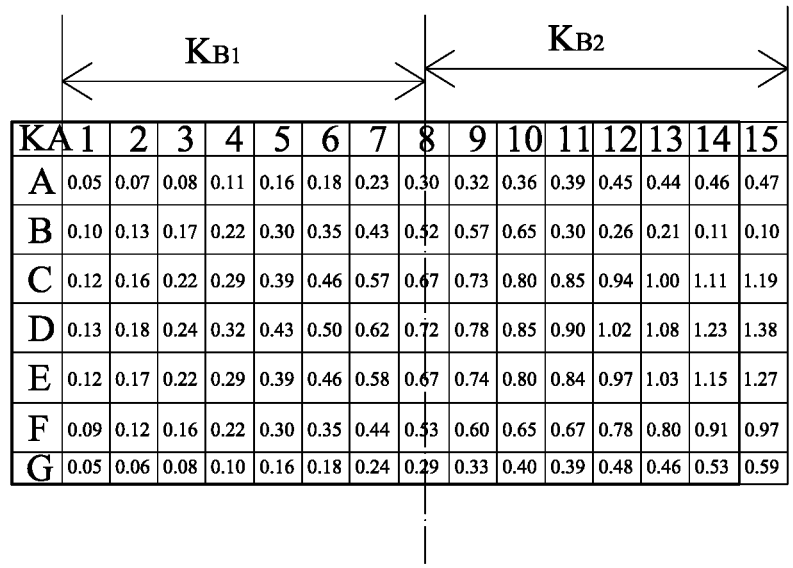
FIG. 12B is a structural view of a distribution of a component ratio $K_B$ of a corresponding touch point detected by the pressure sensing unit in the second pressure sensing region when a fixed value of pressure is applied to each touch sensing unit of the touch panel.

Specifically, as shown in FIGS. 12A-12B, when the pressure sensing unit 121 in the second pressure sensing region 113 operates, a fixed value of touch force F is applied to each touch sensing unit of the touch panel. When the touch sensing force F is applied to the corresponding touch sensing unit, a ratio of the pressure value detected by the pressure sensing unit 121 to the applied touch force F is the component ratio of the touch force corresponding to the touch sensing unit, i.e., the $K_{B1}$ value or the $K_{B2}$ value. That is, when the touch sensing unit in the first pressure sensing region 112 is pressed with the touch force F, the ratio of the pressure value detected by the pressure sensing unit 121 in the second pressure sensing region 113 to the applied touch force F is $K_{B1}$ of the corresponding position. When the touch sensing unit in the second pressure sensing region 113 is pressed with the touch force F, the ratio of the pressure value detected by the pressure sensing unit 121 in the second pressure sensing region 113 to the applied touch force F is $K_{B2}$ of the corresponding location.

Figure 12C:
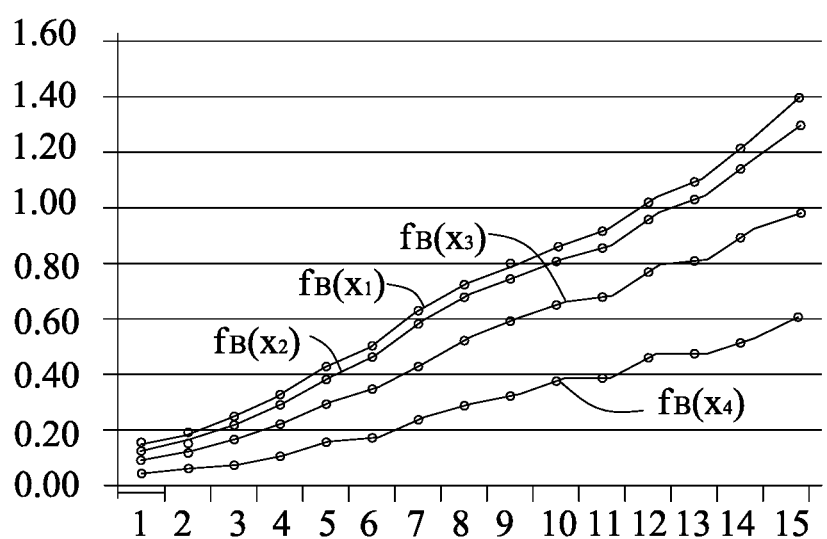
FIG. 12C is a schematic diagram of a relationship between the component ratio $K_B$ of the corresponding touch point detected by the pressure sensing unit in the second pressure sensing region and X-axis when a fixed value of pressure is applied to each touch sensing unit of the touch panel.

As shown in FIG. 12C, a fixed touch force F is applied to each touch sensing unit of the touch panel, and $K_{B1}$ of each touch sensing unit of the first pressure sensing region 112 and $K_{B2}$ of each touch sensing unit of the second pressure sensing region 113 are obtained. $K_{B1}$ and $K_{B2}$ of the touch sensing units of each row and X-axis coordinate satisfy the following equation $f_B(x)$:

$$f_B(x)=ax^3+bx^2+cx+d \qquad (10),$$

in which a, b, c, and d are known constants, and these constants can be obtained by fitting the calculation program.

$K_{B1}$ and $K_{B2}$ of row A are approximately equal to $K_{B1}$ and $K_{B2}$ corresponding to row G, and both satisfy $f_B(x_4)=a_4x_4^3+b_4x_4^2+c_4x_4+d_4$.

$K_{B1}$ and $K_{B2}$ of row B are approximately equal to $K_{B1}$ and $K_{B2}$ corresponding to row F, and both satisfy $f_B(x_3)=a_3x_3^3+b_3x_3^2+c_3x_3+d_3$.

$K_{B1}$ and $K_{B2}$ of row C are approximately equal to $K_{B1}$ and $K_{B2}$ corresponding to row E, and both satisfy $f_B(x_2)=a_2x_2^3+b_2x_2^2+c_2x_2+d_2$.

$K_{B1}$ and $K_{B2}$ of row D satisfy $f_B(x_1)=a_1x_1^3+b_1x_1^2+c_1x_1+d_1$.

That is, when a fixed value of touch force F is applied to each touch sensing unit of the touch panel, the component ratios $K_{B1}$ and $K_{B2}$ of each touch sensing unit acquired by the pressure sensing unit 121 in the second pressure sensing region 113 have a multivariate curve regular correlation with the X-axis coordinate.

Figure 12D:
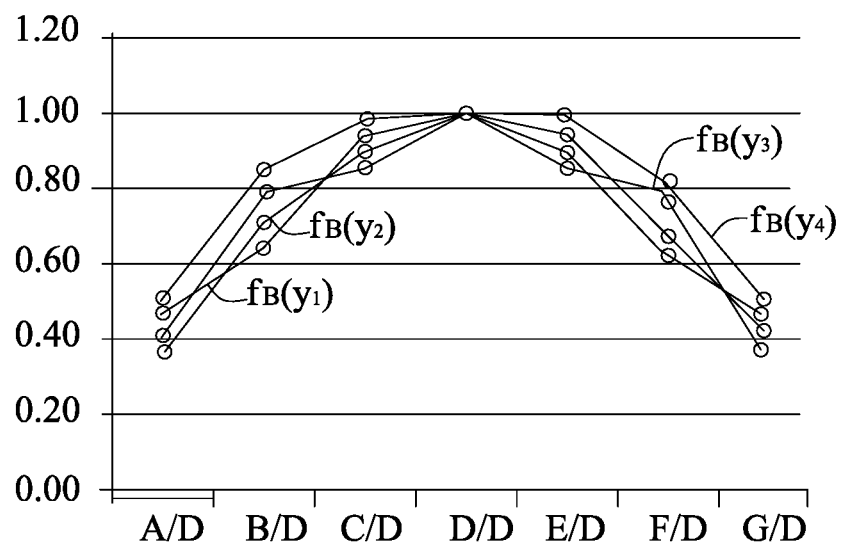
FIG. 12D is a functional relationship diagram between the touch pressure detected by the pressure sensing unit in the second pressure sensing region and the Y-axis when a fixed value of pressure is applied to each touch sensing unit on the touch panel.

As shown in FIG. 12D, at the same time, $K_{B1}$ and $K_{B2}$ of the touch sensing units of each column and the Y-axis satisfy the following equation $f_B(y)$.

$$f_B(y)=Ay^2+By+C \quad (11),$$

in which A, B, and C are constants. These constants can be obtained by fitting the calculation program, and $f_B(y)$ is symmetric on the Y-axis.

The ratio of $K_{A1}$ and $K_{A2}$ of row A to $K_{B1}$ and $K_{B2}$ corresponding to row D satisfies $f_B(y_1)=A_1y_1+B_1y_1+C_1$.

The ratio of $K_{B1}$ and $K_{B2}$ of row B to $K_{B1}$ and $K_{B2}$ corresponding to row D satisfies $f_B(y_2)=A_2y_2^2+B_2y_2+C_2$.

The ratio of $K_{B1}$ and $K_{B2}$ of row C to $K_{B1}$ and $K_{B2}$ corresponding to row D satisfies $f_B(y_3)=A_3y_3^2+B_3y_3+C_3$.

That is, when a fixed value of touch force F is applied to each touch sensing unit of the touch panel, the component ratios $K_{B1}$ and $K_{B2}$ of the touch sensing unit acquired by the pressure sensing unit 121 in the second pressure sensing region 113 are symmetric on the Y-axis, and the values of $K_{B1}$ and $K_{B2}$ are normalized. That is, the values of $K_{B1}$ and $K_{B2}$ gradually decrease from the middle to the two sides on the Y-axis.

Figure 12E:
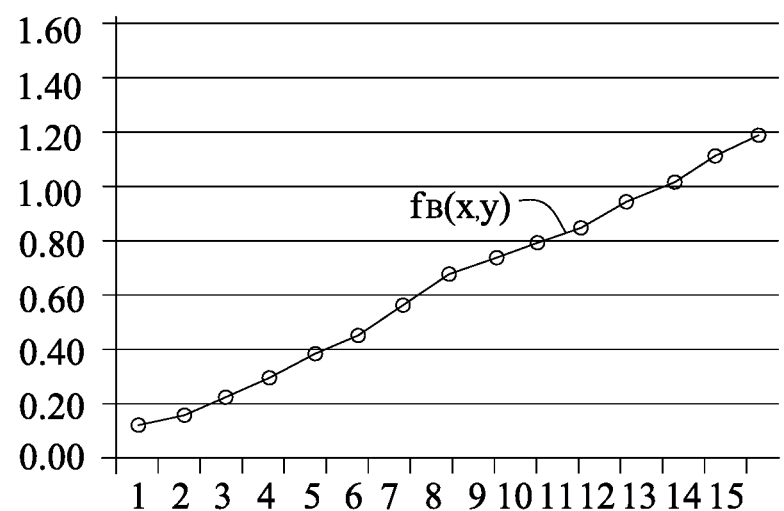
FIG. 12E is a functional relationship diagram between a relationship between the component ratio $K_B$ of the touch point detected by the pressure sensing unit in the second pressure sensing region and the X-axis, and a product of the touch pressure and the function of the Y-axis.

Please refer to FIG. 12E, it is known from the foregoing formulas (5) and (6):

$$K_B=f_B(x)*f_B(y) \quad (12).$$

That is, $K_{B1}=f_B(x_1)*f_B(y_1)$ and $K_{B2}=f_B(x_2)*f_B(y_2)$.

Step S3: the first touch force and the second touch force are calculated according to positions the touch points of the acquired first touch force $F_A$ and the second touch force $F_B$ and the corresponding first measured value $F_1$ and second measured value $F_2$ and by fetching the component ratios $K_A$ and $K_B$ of the touch points corresponding to the first touch force $F_A$ and the second touch force $F_B$.

Specifically, it can be known from the above formulas (1) to (12):

$$F_A=(F_1*K_{B2}-F_2*K_{A2})/(K_{A1}*K_{B2}-K_{B1}*K_{A2}) \quad (13)$$

$$F_B=(F_2*K_{A1}-F_1*K_{B2})/(K_{A1}*K_{B2}-K_{B1}*K_{A2}) \quad (14)$$

$$K_A=f_A(x)*f_A(y); K_B=f_B(x)*f_B(y)$$

in which $K_{A1}=f_A(x_1)*f_A(y_1); K_{B2}=f_B(x_2)*f_B(y_2)$, $K_{B1}=f_B(x_1)*f_B(y_1); K_{A2}=f_A(x_2)*f_A(y_2)$ $f_A(x)=ax^3+bx^2+cx+d; f_A(y)=Ay^2+By+C$ $f_B(x)=ax^3+bx^2+cx+d; f_B(y)=Ay^2+By+C$.

Figure 13A:
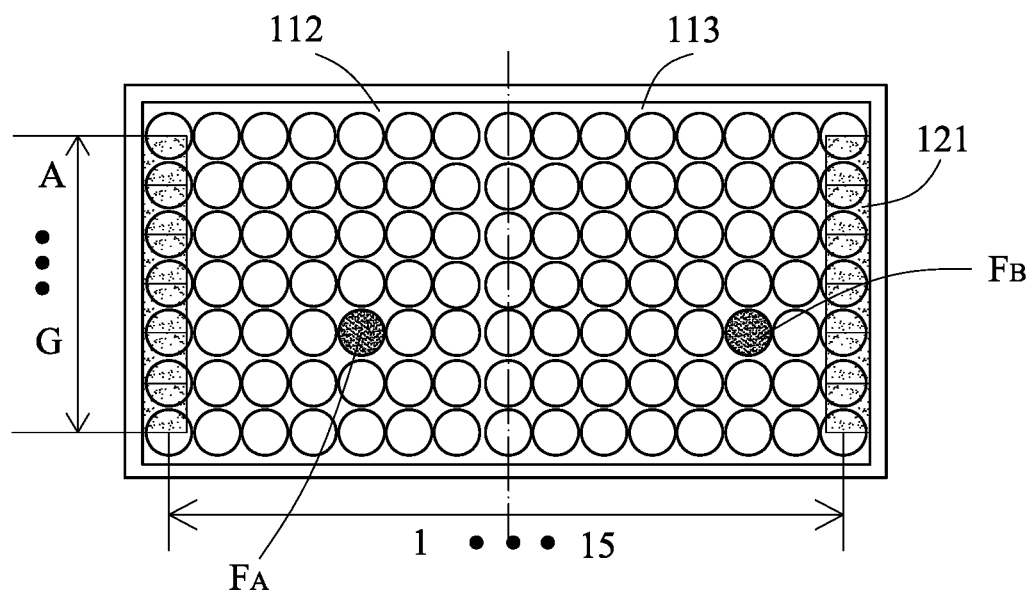
FIG. 13A is a structural view of applying a touch force in a first pressure sensing region and a second pressure sensing region of a touch panel.
Figure 13B:
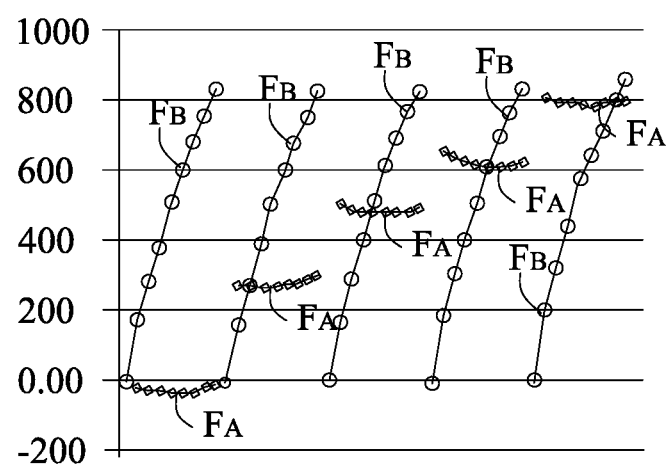
FIG. 13B is a schematic diagram of test results of applying the touch force in the first pressure sensing region and the second pressure sensing region of the touch panel.

Referring to FIGS. 13A-13B, a first touch force $F_A$ is applied to the first pressure sensing region 112, and a second touch force $F_B$ is applied to the second pressure sensing region 113. Five sets of experimental tests were performed, in which in the first group, the first touch force $F_A$ was 0 g, and the second touch force $F_B$ varies from 0 g to 800 g in an arithmetic progression with a tolerance of 100. In the second group, the first touch force $F_A$ is 200 g, and the second touch force $F_B$ is an arithmetic progression with a tolerance of 100 and varies from 0 g to 800 g. In the third group, the first touch force $F_A$ is 400 g, and the second touch force $F_B$ is an arithmetic progression with a tolerance of 100 and varies from 0 g to 800 g. In the fourth group, the first touch force $F_A$ is 600 g, and the second touch force $F_B$ is an arithmetic progression with a tolerance of 100 and varies from 0 g to 800 g. In the fifth group, the first touch force $F_A$ is 800 g, and the second touch force $F_B$ is an arithmetic progression with a tolerance of 100 and varies from 0 g to 800 g. The experimental results are shown in FIG. 13B. In the figure, we can conclude that the pressure detection method has high detection precision and can accurately obtain the magnitude of the force applied to the touch panel.

Compared to the prior art, the pressure sensing module provided by the present disclosure has the following advantages.

1. A pressure sensing layer is formed over a substrate, and the pressure sensing layer is provided with a plurality of pressure sensing units. The pressure sensing units are axially symmetrically distributed along the X-axis or the Y-axis of the substrate. The pressure sensing unit includes four resistors with the same resistance to constitute a Wheatstone bridge, in which pattern shapes of two of the resistors have a same extending direction and are not adjacent to each other. The pressure sensing module of the present disclosure can effectively overcome the issue that distortion of signals of the pressing force due to the difference of sensing signals of the pressing force of the current pressure sensing unit under the influence of environment (e.g., temperature factor), and thus allowing the pressure sensing module to measure the two-point touch pressure more precisely.

At the same time, the present disclosure adopts the single-sided bridge, which can help to overcome the temperature and other noise issues. In addition, the manufacturing of the single-sided bridge is simpler and less expensive. The pressure sensing module of the present disclosure also has the advantages of simple structure and high sensing precision.

2. The substrate is rectangular-shaped, the pressure sensing units are rectangular-shaped, and four corners of the substrate are provided with pressure sensing units. There is the same included angle α between the first side or the second side of the pressure sensing units at the four corners of the substrate and the side of the X-axis direction of the substrate 11, or there is the same included angle α between the first side or the second side of the pressure sensing units at the four corners of the substrate and the side of the Y-axis direction of the substrate. Therefore, any two-point touch pressure value detected by the pressure sensing units does not offset each other or slightly offset, and thus the pressure sensing module can more precisely measure the two-point touch pressure.

3. The touch panel provided by the present disclosure includes the above-mentioned pressure sensing module, which can precisely obtain any two-point touch pressure applied to the touch panel.

4. The method of detecting the two-point touch pressure can precisely acquire the touch pressure on opposite two sides on the touch surface of the touch screen.

The above are only the preferred embodiments of the present disclosure, and are not intended to limit the present invention, and any modifications, equivalents, and improvements made within the principles of the present disclosure should be included in the scope of the present disclosure.

What is claimed is:

1. A pressure sensing module, comprising:
a substrate; and
a sensing layer formed over the substrate, the sensing layer including a plurality of pressure sensing units axially symmetrically disposed along a symmetry axis of the substrate to form a first pressure sensing region and a second pressure sensing region with the symmetry axis being a boundary dividing the first pressure sensing region and second pressure sensing region;
wherein the pressure sensing units in each of the first pressure sensing region and the second pressure sensing region are positioned under a quadrilateral-shaped arrangement, and the quadrilateral shape has no more than one pair of sides that are parallel, and at least two of the pressure sensing units are positioned in a middle region of each of the first and second pressure sensing region;
wherein each of the pressure sensitive units including four resistors having significantly the same resistance, the four resistors configured as a Wheatstone bridge; and
wherein pattern shapes of two of the resistors have the same extending direction and are not adjacent;
wherein the pressure sensing model is configured to detect a two-point touch pressure, the detection comprising:
applying a first touch force $F_A$ in the first pressure sensing region and applying a second touch force $F_B$ in the second pressure sensing region to sense touch positions of the first touch force $F_A$ and the second touch force $F_B$ and respectively acquire position information of touch points with a touch sensing unit;
respectively acquiring a first measured value $F_1$ of the pressure sensing unit in the first pressure sensing region and a second measured value $F_2$ of the pressure sensing unit in the second pressure sensing region, and when a known force F is applied on the pressure sensing model and the touch sensing unit, acquiring a component ratio $K_A$ of the force F at any touch point acquired by the pressure sensing unit in the first pressure sensing region and a component ratio $K_B$ of the force F at any touch point acquired by the pressure sensing unit in the second pressure sensing region; and
according to positions of the touch points of the acquired first touch force $F_A$ and the second touch force $F_B$, the first measured value $F_1$ and the second measured value $F_2$, fetching the component ratios $K_A$ and $K_B$ of the touch points corresponding to the first touch force $F_A$ and the second touch force $F_B$ to calculate the first touch force $F_A$ and the second touch force $F_B$;
wherein the component ratio $K_A$ of the touch point comprises a proportional component $K_{A1}$ of each corresponding touch point of the first touch force $F_A$ in the first pressure sensing region and a proportional component $K_{A2}$ of each corresponding touch point of the second touch force $F_B$ in the second pressure sensing region; and
wherein the component ratio $K_B$ of the touch point comprises a proportional component $K_{B1}$ of each corresponding touch point of the first touch force $F_A$ in the first pressure sensing region and a proportional component $K_{B2}$ of each corresponding touch point of the second touch force $F_B$ in the second pressure sensing region, wherein $$F_A = (F_1 * K_{B2} - F_2 * K_{A2})/(K_{A1} * K_{B2} - K_{B1} * K_{A2});$$

and $$F_B = (F_2 * K_{A1} - F_1 * K_{B2})/(K_{A1} * K_{B2} - K_{B1} * K_{A2}).$$

2. The pressure sensing module of claim 1, wherein:
the substrate is a rectangular substrate,
the pressure sensing units are disposed at four corners of the substrate,
the pressure sensing unit at each of the corners is rectangular-shaped,
a first included angle is the same between a first side or a second side of the pressure sensing unit and a side of an X-axis direction of the substrate;
or a second included angle is the same between a first side or a second side of the pressure sensing unit and a side of a Y-axis direction of the substrate perpendicular to the X-axis direction.

3. The pressure sensing module of claim 2, wherein the first included angle and the second included angle are in a range from 35° to 55°.

4. The pressure sensing module of claim 3, wherein the first included angle and the second included angle is 45°.

5. The pressure sensing module of claim 1, wherein the pattern shapes of the two resistors having the same extending direction are diagonally distributed.

6. The pressure sensing module of claim 1, wherein the two resistors having the pattern shapes having the same extending direction are defined as a first group of resistors, and the other two resistors are defined as a second group of resistors, and the pattern shapes of the first group of resistors and the pattern shapes of the second group of resistors have different extending directions.

7. The pressure sensing module of claim 6, wherein the extending direction of the pattern shapes of the first group of resistors is perpendicular to the extending direction of the pattern shapes of the second group of resistors.

8. A touch panel, comprising:
the pressure sensing module of claim 1 and
the touch sensing unit configured to detect a position information.

9. The pressure sensing module of claim 1, wherein:
values of $K_{A1}$ and $K_{A2}$ have a multivariate curve regular correlation with an X-axis coordinate,
the values of $K_{A1}$ and $K_{A2}$ are symmetric on a Y-axis perpendicular to the X-axis,
the values of $K_{A1}$ and $K_{A2}$ are normalized,
values of $K_{B1}$ and $K_{B2}$ have a multivariate curve regular correlation with the X-axis coordinate,
the values of $K_{B1}$ and $K_{B2}$ are symmetric on the Y-axis, and
the values of $K_{B1}$ and $K_{B2}$ are normalized.

10. The pressure sensing module of claim 1, wherein the pattern shapes of the two adjacent resistors are maintained in a range of from 0.01 mm to 2 mm.

11. The pressure sensing module of claim 1, wherein the quadrilateral shape is a trapezoid.

12. A touch display panel, comprising:
the pressure sensing module of claim 1;
the touch sensing unit configured to detect a position information; and
a display module;
wherein all pressure sensing units of the pressure sensing module are positioned within a display area of the display module.

13. A method of detecting a two-point touch pressure of a touch panel having a pressure sensing module and a touch sensing unit configured to detect a position information, the method comprising:
applying a first touch force $F_A$ in the first pressure sensing region and applying a second touch force $F_B$ in the second pressure sensing region to sense touch positions of the first touch force $F_A$ and the second touch force $F_B$ and respectively acquire position information of touch points;
respectively acquiring a first measured value $F_1$ of the pressure sensing unit in the first pressure sensing region and a second measured value $F_2$ of the pressure sensing unit in the second pressure sensing region, and when a known force F is applied on the touch panel, acquiring a component ratio $K_A$ of the force F at any touch point acquired by the pressure sensing unit in the first pressure sensing region and a component ratio $K_B$ of the force F at any touch point acquired by the pressure sensing unit in the second pressure sensing region; and
according to positions of the touch points of the acquired first touch force $F_A$ and the second touch force $F_B$, the first measured value $F_1$ and the second measured value $F_2$, fetching the component ratios $K_A$ and $K_B$ of the touch points corresponding to the first touch force $F_A$ and the second touch force $F_B$ to calculate the first touch force $F_A$ and the second touch force $F_B$;
wherein the component ratio $K_A$ of the touch point comprises a proportional component $K_{A1}$ of each corresponding touch point of the first touch force $F_A$ in the first pressure sensing region and a proportional component $K_{A2}$ of each corresponding touch point of the second touch force $F_B$ in the second pressure sensing region;
wherein the component ratio $K_B$ of the touch point comprises a proportional component $K_{B1}$ of each corresponding touch point of the first touch force $F_A$ in the first pressure sensing region and a proportional component $K_{B2}$ of each corresponding touch point of the second touch force $F_B$ in the second pressure sensing region;
wherein $$F_A = (F_1 * K_{B2} - F_2 * K_{A2})/(K_{A1} * K_{B2} - K_{B1} * K_{A2});$$

wherein $$F_B = (F_2 * K_{A1} - F_1 * K_{B2})/(K_{A1} * K_{B2} - K_{B1} * K_{A2});$$ and wherein the pressure sensing module comprises:
a substrate; and
a sensing layer formed over the substrate, the sensing layer includes a plurality of pressure sensing units axially symmetrically disposed along a symmetry axis of the substrate to form a first pressure sensing region and a second pressure sensing region, each of the pressure sensitive units including four resistors having significantly the same resistance, the four resistors configured as a Wheatstone bridge, pattern shapes of two of the resistors having the same extending direction and are not adjacent.

14. The method of detecting a two-point touch pressure of the touch panel of claim 13, wherein:
values of $K_{A1}$ and $K_{A2}$ have a multivariate curve regular correlation with an X-axis coordinate,
the values of $K_{A1}$ and $K_{A2}$ are symmetric on a Y-axis perpendicular to the X-axis,
the values of $K_{A1}$ and $K_{A2}$ are normalized,
values of $K_{B1}$ and $K_{B2}$ have a multivariate curve regular correlation with the X-axis coordinate,
the values of $K_{B1}$ and $K_{B2}$ are symmetric on the Y-axis, and
the values of $K_{B1}$ and $K_{B2}$ are normalized.

* * * * *